United States Patent
Sarkis et al.

(10) Patent No.: US 11,652,574 B2
(45) Date of Patent: May 16, 2023

(54) CONFIGURING AND SIGNALING AN INTERLEAVING MODE THAT INCLUDES IN-ALLOCATION INTERLEAVING

(71) Applicant: QUALCOMM Incorporated, San Diego, CA (US)

(72) Inventors: Gabi Sarkis, San Diego, CA (US); Alexandros Manolakos, Escondido, CA (US); Joseph Binamira Soriaga, San Diego, CA (US); Aamod Khandekar, San Diego, CA (US); Yuanning Yu, Santa Clara, CA (US); Pouriya Sadeghi, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 368 days.

(21) Appl. No.: 16/944,672

(22) Filed: Jul. 31, 2020

(65) Prior Publication Data

US 2021/0044383 A1    Feb. 11, 2021

(30) Foreign Application Priority Data

Aug. 7, 2019 (GR) .............................. 20190100341

(51) Int. Cl.
*H04W 76/27* (2018.01)
*H04L 1/00* (2006.01)
*H04W 72/23* (2023.01)

(52) U.S. Cl.
CPC ........... *H04L 1/0071* (2013.01); *H04W 72/23* (2023.01); *H04W 76/27* (2018.02)

(58) Field of Classification Search
None
See application file for complete search history.

(56) References Cited

U.S. PATENT DOCUMENTS

2008/0028188 A1* 1/2008 Zhong ............... H03M 13/2742
                                                          712/200
2009/0013136 A1* 1/2009 Chi .................. H03M 13/2764
                                                       711/E12.079

(Continued)

FOREIGN PATENT DOCUMENTS

CA        3049322 A1    9/2018
WO     2019095256 A1    5/2019

OTHER PUBLICATIONS

3GPP TS 38.214, "3rd Generation Partnership Project, Technical Specification Group Radio Access Network, NR, Physical Layer Procedures for Data (Release 15)", 3GPP Standard, Technical Specification, 3GPP TS 38.214, 3rd Generation Partnership Project (3GPP), Mobile Competence Centre, 650, Route Des Lucioles, F-06921, Sophia-Antipolis Cedex, France, vol. RAN WG1, No. V15.6.0, Jun. 24, 2019 (Jun. 24, 2019), XP051754328, pp. 1-105, [Retrieved on Jun. 24, 2019] Section 5.2, chapter 5.1.5, Section 5.1.2.2, p. 15-p. 16.

(Continued)

*Primary Examiner* — Sithu Ko
*Assistant Examiner* — Emmanuel K Maglo
(74) *Attorney, Agent, or Firm* — Harrity & Harrity, LLP

(57) ABSTRACT

Various aspects of the present disclosure generally relate to wireless communication. In some aspects, a user equipment (UE) may receive an indication of at least one of a first interleaving mode for mapping codeblocks to a data channel or a second interleaving mode for reporting channel state information (CSI). The UE may map codeblocks to the data channel based at least in part on the first interleaving mode. The UE may report CSI based at least in part on the second interleaving mode. Numerous other aspects are provided.

30 Claims, 13 Drawing Sheets

(56) References Cited

U.S. PATENT DOCUMENTS

| | | | |
|---|---|---|---|
| 2013/0010685 A1* | 1/2013 | Kim | H04L 1/0071 370/315 |
| 2013/0064099 A1* | 3/2013 | Kim | H04W 72/0446 370/241 |
| 2015/0139135 A1* | 5/2015 | Kim | H04L 27/2602 370/329 |
| 2015/0208390 A1* | 7/2015 | Zhao | H04W 72/23 370/330 |
| 2015/0358111 A1* | 12/2015 | Marinier | H04W 72/23 370/329 |
| 2016/0065277 A1 | 3/2016 | Moss et al. | |
| 2016/0105257 A1* | 4/2016 | Jiao | H04L 1/0048 375/148 |
| 2016/0374080 A1* | 12/2016 | Wei | H04W 72/0446 |
| 2017/0026943 A1* | 1/2017 | Kim | H04L 5/0053 |
| 2018/0367202 A1* | 12/2018 | Yang | H04B 7/0639 |
| 2019/0149365 A1* | 5/2019 | Chatterjee | H04W 80/02 370/329 |
| 2019/0215809 A1* | 7/2019 | Yang | H04L 25/02 |
| 2019/0223160 A1* | 7/2019 | He | H04W 68/02 |
| 2019/0394760 A1* | 12/2019 | Hwang | H04L 5/003 |
| 2020/0119869 A1* | 4/2020 | Taherzadeh Boroujeni | H04B 7/0617 |
| 2020/0137745 A1* | 4/2020 | Bachu | H04L 69/323 |
| 2020/0314881 A1* | 10/2020 | Bagheri | H04L 5/0051 |
| 2020/0374045 A1* | 11/2020 | Yin | H04L 1/1854 |
| 2022/0078803 A1* | 3/2022 | Yang | H04L 5/001 |
| 2022/0095350 A1* | 3/2022 | Lee | H04L 1/0003 |

OTHER PUBLICATIONS

International Search Report and Written Opinion—PCT/US2020/044734—ISA/EPO—dated Nov. 3, 2020.

Qualcomm Views: "eMBB Evolution for Rel-17 Qualcomm Views", 3GPP Draft, RP-190835, 3GPP RAN #84, EMBB-R17-QCOM, 3rd Generation Partnership Project (3GPP), Mobile Competence Centre, 650, Route Des Lucioles, F-06921, Sophia-Antipolis Cedex, France, No. Newport Beach, Jun. 3, 2019-Jun. 6, 2019, Jun. 2, 2019 (Jun. 2, 2019), XP051746119, pp. 1-11, Retrieved from the Internet: URL: http://www.3gpp.org/ftp/Meetings%5F3GPP%5FSYNC/RAN/Docs/RP%2D190835%2Ezip [retrieved on Jun. 2, 2019] p. 6.

* cited by examiner

CONFIGURING AND SIGNALING AN INTERLEAVING MODE THAT INCLUDES IN-ALLOCATION INTERLEAVING

CROSS-REFERENCE TO RELATED APPLICATION

This Patent Application claims priority to Greece Patent Application No. 20190100341, filed Aug. 7, 2019, entitled "CONFIGURING AND SIGNALING AN INTERLEAVING MODE THAT INCLUDES IN-ALLOCATION INTERLEAVING," and assigned to the assignee hereof. The disclosure of the prior Application is considered part of and is incorporated by reference in this Patent Application.

FIELD OF THE DISCLOSURE

Aspects of the present disclosure generally relate to wireless communication and to techniques and apparatuses for configuring and signaling an interleaving mode that includes in-allocation interleaving.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

SUMMARY

In some aspects, a method of wireless communication, performed by a user equipment (UE), may include receiving at least one of an indication of a first interleaving mode for mapping codeblocks to a data channel or a second interleaving mode for reporting channel state information (CSI); mapping codeblocks to the data channel based at least in part on the first interleaving mode; and reporting CSI based at least in part on the second interleaving mode.

In some aspects, a method of wireless communication, performed by a UE, may include transmitting, to a base station, a capability report that indicates an interleaving capability of the UE, wherein the interleaving capability indicates whether the UE is capable of operating in an interleaving mode that interleaves only virtual resource blocks (VRBs) that are allocated to the UE; and mapping codeblocks to a data channel for one or more communications based at least in part on the interleaving capability.

In some aspects, a UE for wireless communication may include memory and one or more processors operatively coupled to the memory. The memory and the one or more processors may be configured to receive at least one of an indication of a first interleaving mode for mapping codeblocks to a data channel or a second interleaving mode for reporting CSI; map codeblocks to the data channel based at least in part on the first interleaving mode; and report CSI based at least in part on the second interleaving mode.

In some aspects, a UE for wireless communication may include memory and one or more processors operatively coupled to the memory. The memory and the one or more processors may be configured to transmit, to a base station, a capability report that indicates an interleaving capability of the UE, wherein the interleaving capability indicates whether the UE is capable of operating in an interleaving mode that interleaves only VRBs that are allocated to the UE; and map codeblocks to a data channel for one or more communications based at least in part on the interleaving capability.

In some aspects, a non-transitory computer-readable medium may store one or more instructions for wireless communication. The one or more instructions, when executed by one or more processors of a UE, may cause the one or more processors to: receive at least one of an indication of a first interleaving mode for mapping codeblocks to a data channel or a second interleaving mode for reporting CSI; map codeblocks to the data channel based at least in part on the first interleaving mode; and report CSI based at least in part on the second interleaving mode.

In some aspects, a non-transitory computer-readable medium may store one or more instructions for wireless communication. The one or more instructions, when executed by one or more processors of a UE, may cause the one or more processors to: transmit, to a base station, a capability report that indicates an interleaving capability of the UE, wherein the interleaving capability indicates whether the UE is capable of operating in an interleaving mode that interleaves only VRBs that are allocated to the UE; and map codeblocks to a data channel for one or more communications based at least in part on the interleaving capability.

In some aspects, an apparatus for wireless communication may include means for receiving an indication of at least one of a first interleaving mode for mapping codeblocks to a data channel or a second interleaving mode for reporting CSI; means for mapping codeblocks to the data channel based at least in part on the first interleaving mode; and means for reporting CSI based at least in part on the second interleaving mode.

In some aspects, an apparatus for wireless communication may include means for transmitting, to a base station, a capability report that indicates an interleaving capability of the apparatus, wherein the interleaving capability indicates whether the apparatus is capable of operating in an interleaving mode that interleaves only VRBs that are allocated to the apparatus; and means for mapping codeblocks to a data channel for one or more communications based at least in part on the interleaving capability.

In some aspects, a method of wireless communication, performed by a base station, may include transmitting, to a UE, an indication of at least one of a first interleaving mode for mapping codeblocks to a data channel or a second interleaving mode for reporting CSI; mapping codeblocks to the data channel based at least in part on the first interleaving mode; and receiving a CSI report, wherein CSI included in the CSI report is estimated based at least in part on the second interleaving mode.

In some aspects, a method of wireless communication, performed by a base station, may include receiving, from a UE, a capability report that indicates an interleaving capability of the UE, wherein the interleaving capability indicates whether the UE is capable of operating in an interleaving mode that interleaves only VRBs that are allocated to the UE; and mapping codeblocks to a data channel for one or more communications based at least in part on the interleaving capability.

In some aspects, a base station for wireless communication may include memory and one or more processors operatively coupled to the memory. The memory and the one or more processors may be configured to transmit, to a UE, an indication of at least one of a first interleaving mode for mapping codeblocks to a data channel or a second interleaving mode for reporting CSI; map codeblocks to the data channel based at least in part on the first interleaving mode; and receive a CSI report, wherein CSI included in the CSI report is estimated based at least in part on the second interleaving mode.

In some aspects, a base station for wireless communication may include memory and one or more processors operatively coupled to the memory. The memory and the one or more processors may be configured to receive, from a UE, a capability report that indicates an interleaving capability of the UE, wherein the interleaving capability indicates whether the UE is capable of operating in an interleaving mode that interleaves only VRBs that are allocated to the UE; and map codeblocks to a data channel for one or more communications based at least in part on the interleaving capability.

In some aspects, a non-transitory computer-readable medium may store one or more instructions for wireless communication. The one or more instructions, when executed by one or more processors of a base station, may cause the one or more processors to: transmit, to a UE, an indication of at least one of a first interleaving mode for mapping codeblocks to a data channel or a second interleaving mode for reporting CSI; map codeblocks to the data channel based at least in part on the first interleaving mode; and receive a CSI report, wherein CSI included in the CSI report is estimated based at least in part on the second interleaving mode.

In some aspects, a non-transitory computer-readable medium may store one or more instructions for wireless communication. The one or more instructions, when executed by one or more processors of a base station, may cause the one or more processors to: receive, from a UE, a capability report that indicates an interleaving capability of the UE, wherein the interleaving capability indicates whether the UE is capable of operating in an interleaving mode that interleaves only VRBs that are allocated to the UE; and map codeblocks to a data channel for one or more communications based at least in part on the interleaving capability.

In some aspects, an apparatus for wireless communication may include means for transmitting, to a UE, an indication of at least one of a first interleaving mode for mapping codeblocks to a data channel or a second interleaving mode for reporting CSI; means for mapping codeblocks to the data channel based at least in part on the first interleaving mode; and means for receiving a CSI report, wherein CSI included in the CSI report is estimated based at least in part on the second interleaving mode.

In some aspects, an apparatus for wireless communication may include means for receiving, from a UE, a capability report that indicates an interleaving capability of the UE, wherein the interleaving capability indicates whether the UE is capable of operating in an interleaving mode that interleaves only VRBs that are allocated to the UE; and means for mapping codeblocks to a data channel for one or more communications based at least in part on the interleaving capability.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effec

DETAILED DESCRIPTION

Figure 1:
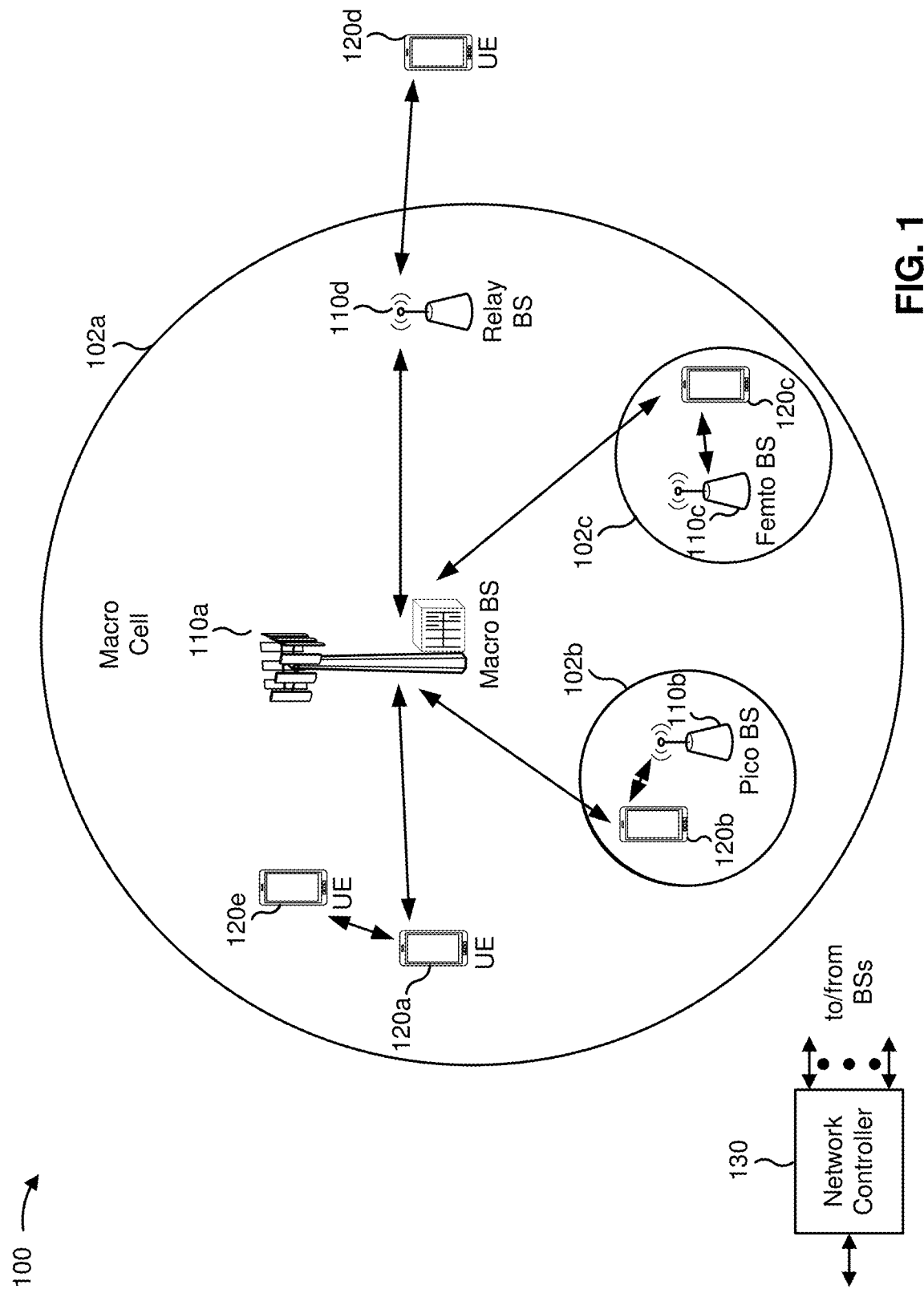
- FIG. 1 is a block diagram illustrating an example of a wireless communication network, in accordance with various aspects of the present disclosure.

When multiple interleaving modes are possible, communications between a UE and a base station may fail if the UE and the base station do not communicate the type of interleaving mode being used. In some cases, different interleaving modes may be used for different communications, such as communications that occur at different times, different types of communications, and/or the like. Furthermore, an interleaving mode may be used for different purposes, such as to perform virtual resource block (VRB) to physical resource block (PRB) mapping for downlink data communications, to perform VRB to PRB mapping for uplink data communications, to estimate channel state information (CSI) (e.g., where different CSI may be reported, assuming different interleaving modes), and/or the like. Some techniques and apparatuses described herein permit effective and efficient configuration and signaling of different interleaving modes to be used in different scenarios (e.g., for different communications, for different purposes, and/or the like).

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, etc.

Wireless network 100 may be a heterogeneous network that includes BSs of different types, e.g., macro BSs, pico BSs, femto BSs, relay BSs, etc. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time—frequency resources and having a cellular configuration, a P2P configuration, and a mesh configuration, a scheduling entity and one or more subordinate entities may communicate utilizing the scheduled resources.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
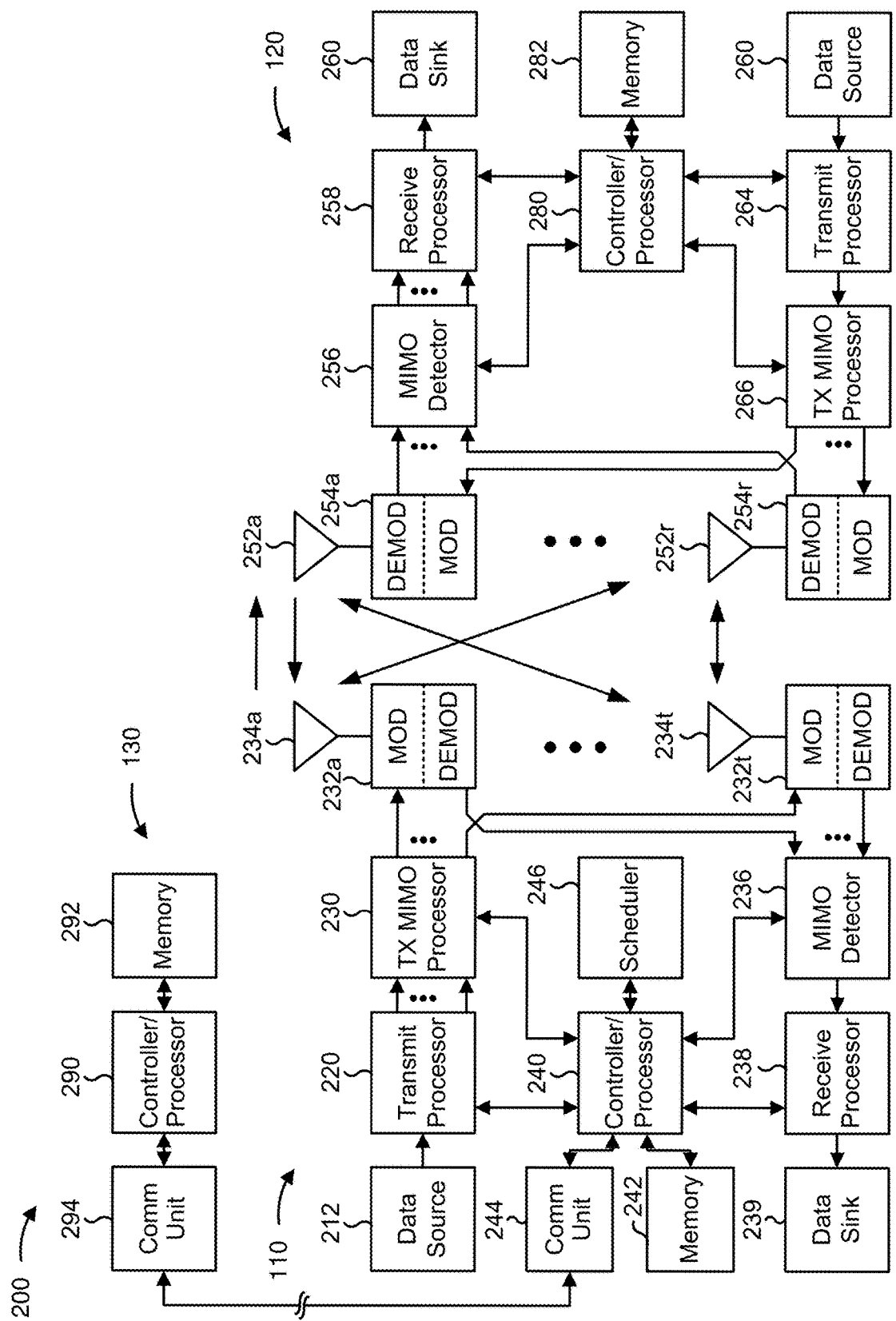
FIG. 2 is a block diagram illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), etc. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, etc.) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with configuring and signaling an interleaving mode that includes in-allocation interleaving, as described in more detail elsewhere herein. For example, controller/processor 240 of base station 110, controller/processor 280 of UE 120, and/or any other component(s) of FIG. 2 may perform or direct operations of, for example, process 1000 of FIG. 10, process 1100 of FIG. 11, process 1200 of FIG. 12, process 1300 of FIG. 13, and/or other processes as described herein. Memories 242 and 282 may store data and program codes for base station 110 and UE 120, respectively. A scheduler 246 may schedule UEs for data transmission on the downlink and/or uplink.

Figure 10:
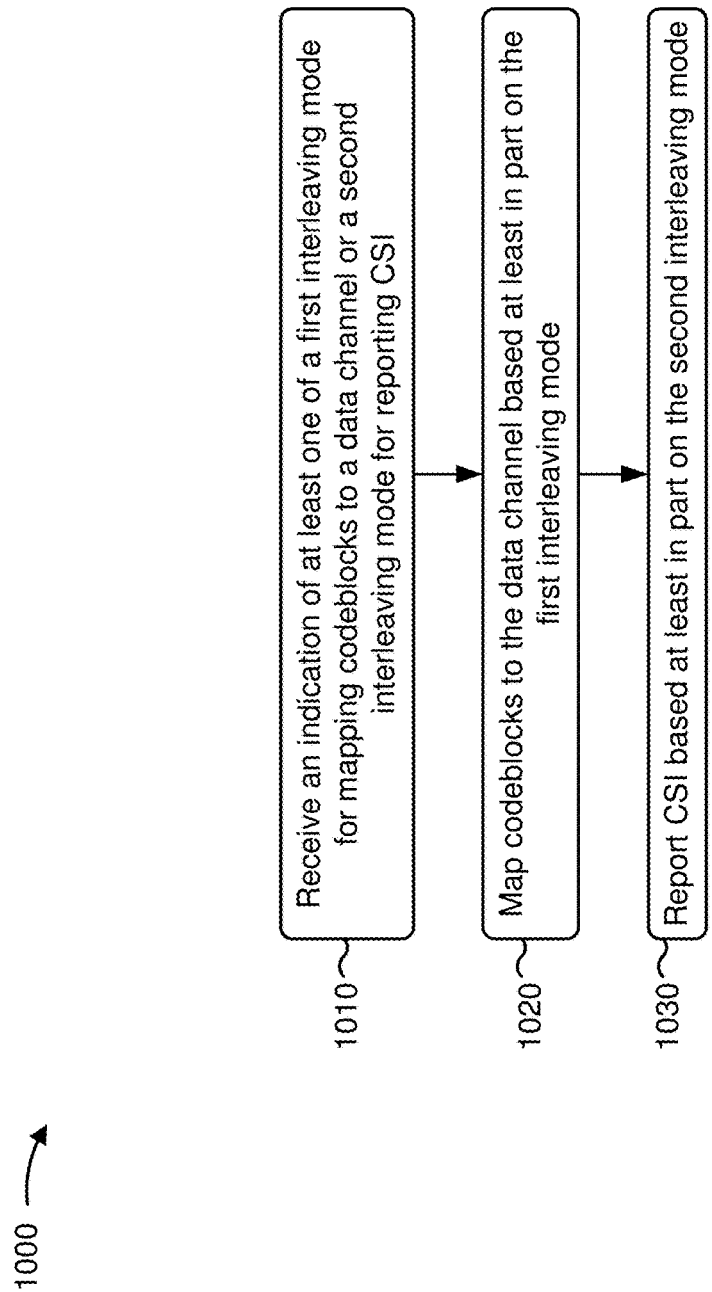
FIGS. 10-13 are diagrams illustrating example processes relating to configuring and signaling an interleaving mode that includes in-allocation interleaving, in accordance with various aspects of the present disclosure.
Figure 11:
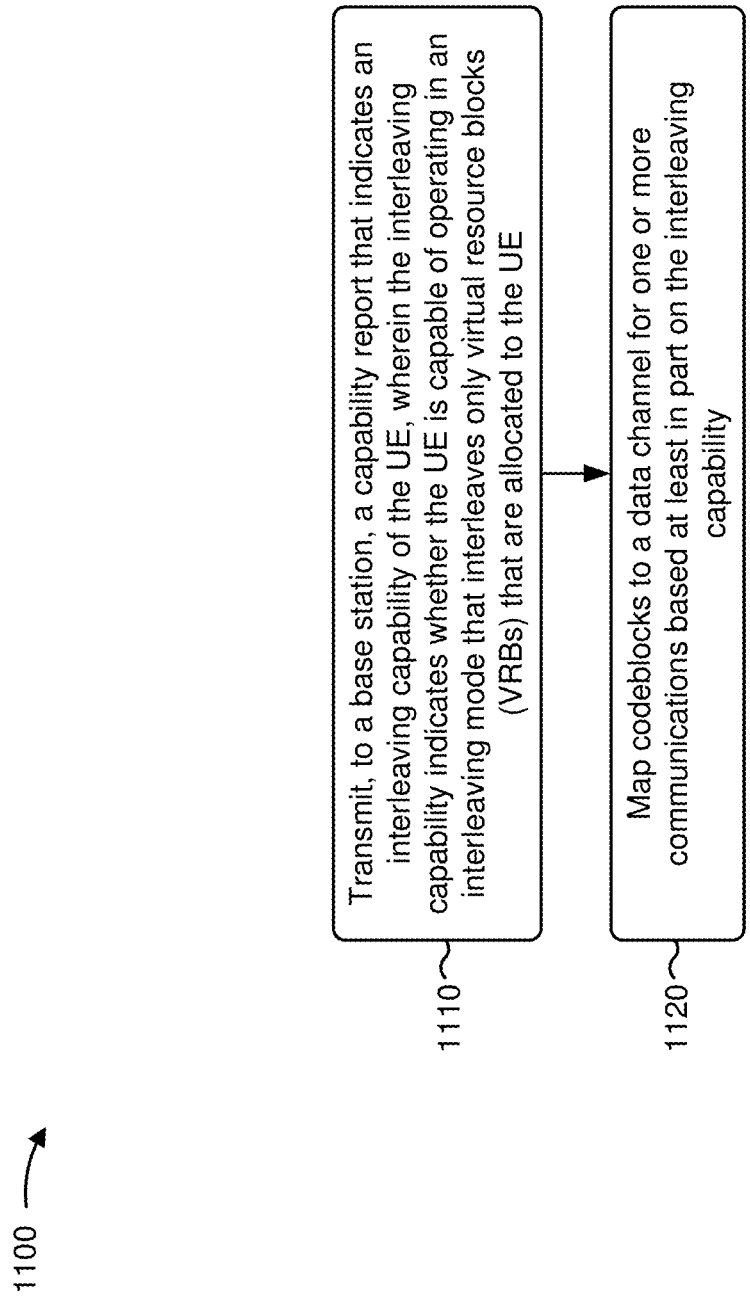

The stored program codes, when executed by processor 280 and/or other processors and modules at UE 120, may cause the UE 120 to perform operations described with respect to process 1000 of FIG. 10, process 1100 of FIG. 11, and/or other processes as described herein. The stored program codes, when executed by processor 240 and/or other processors and modules at base station 110, may cause the base station 110 to perform operations described with respect to process 1200 of FIG. 12, process 1300 of FIG. 13, and/or other processes as described herein. A scheduler 246 may schedule UEs for data transmission on the downlink and/or uplink.

In some aspects, UE 120 may include means for receiving an indication of at least one of a first interleaving mode for mapping codeblocks to a data channel or a second interleaving mode for reporting CSI; means for mapping codeblocks to the data channel based at least in part on the first interleaving mode; means for reporting CSI based at least in part on the second interleaving mode; and/or the like. Additionally, or alternatively, UE 120 may include means for transmitting, to a base station, a capability report that indicates an interleaving capability of the UE, wherein the interleaving capability indicates whether the UE is capable of operating in an interleaving mode that interleaves only VRBs that are allocated to the UE; means for mapping codeblocks to a data channel for one or more communications based at least in part on the interleaving capability; and/or the like. In some aspects, such means may include one or more components of UE 120 described in connection with FIG. 2.

In some aspects, base station 110 may include means for transmitting, to a UE, an indication of at least one of a first interleaving mode for mapping codeblocks to a data channel or a second interleaving mode for reporting CSI; means for mapping codeblocks to the data channel based at least in part on the first interleaving mode; means for receiving a CSI report, wherein CSI included in the CSI report is estimated based at least in part on the second interleaving mode; and/or the like. Additionally, or alternatively, base station 110 may include means for receiving, from a UE, a capability report that indicates an interleaving capability of the UE, wherein the interleaving capability indicates whether the UE is capable of operating in an interleaving mode that interleaves only VRBs that are allocated to the UE; means for mapping codeblocks to a data channel for one or more communications based at least in part on the interleaving capability; and/or the like. In some aspects, such means may include one or more components of base station 110 described in connection with FIG. 2.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of processor 280.

As indicated above, FIG. 2 is provided merely as an example. Other examples may differ from what is described with regard to FIG. 2.

Figure 3:
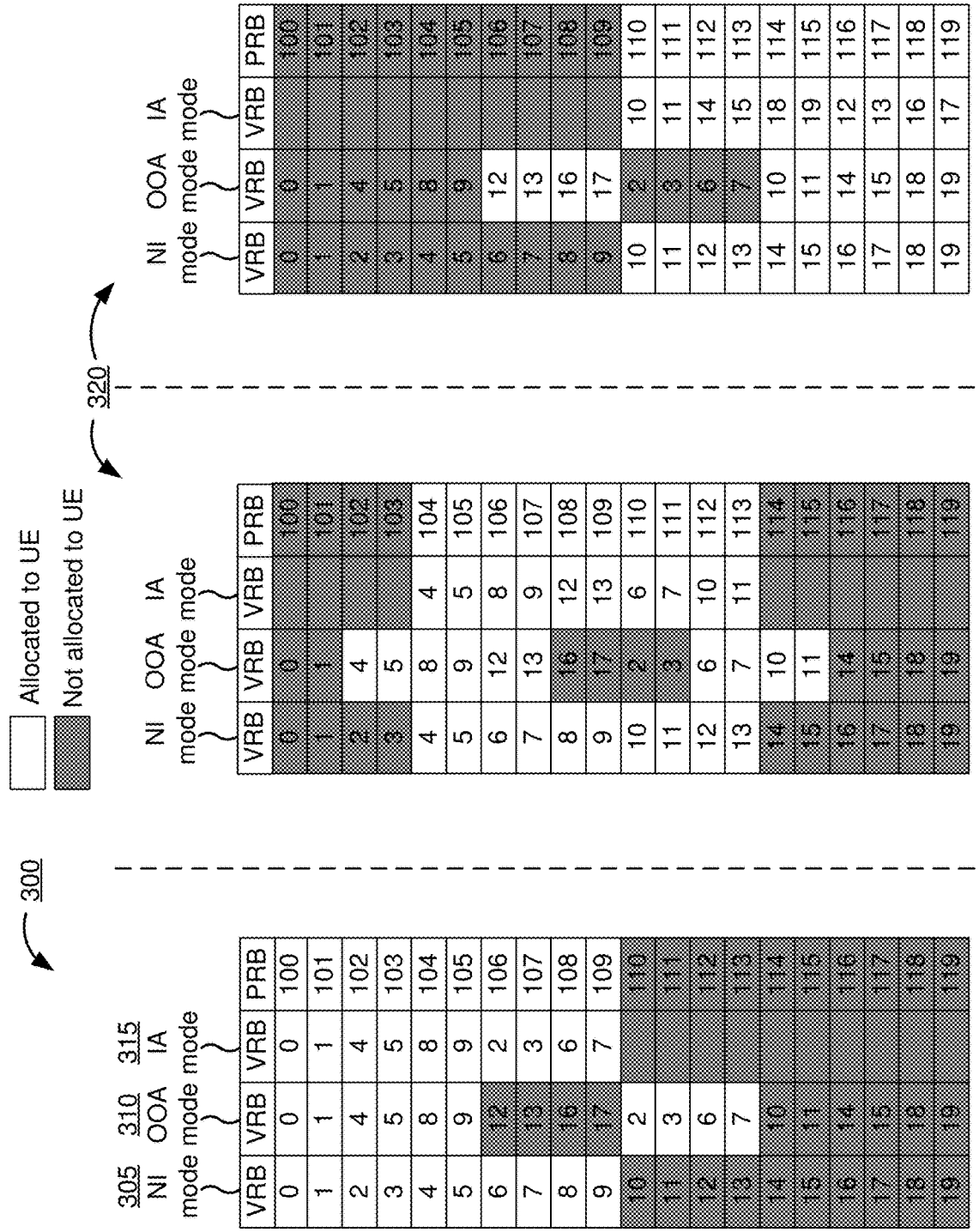
FIGS. 3 and 4 are diagrams illustrating examples of different interleaving modes, in accordance with various aspects of the present disclosure.

FIG. 3 is a diagram illustrating an example 300 of different interleaving modes, in accordance with various aspects of the present disclosure. FIG. 3 shows interleaving modes for a contiguous VRB allocation (e.g., of VRBs 0 through 9), sometimes referred to as a Type 1 VRB allocation.

When a transmitter (e.g., a base station 110, a UE 120, and/or the like) transmits data to a receiver (e.g., a base station 110, a UE 120, and/or the like), the transmitter may apply interleaving to achieve frequency diversity and improve decoding performance. The data may be transmitted in a transport block (TB). The TB may be segmented into codeblocks (CBs), and multiple codeblocks may be transmitted in a symbol (e.g., an OFDM symbol). A codeblock may refer to a segment of a TB, and may include a set of resource blocks (e.g., VRBs, physical resource blocks (PRBs), and/or the like). The number of resource blocks (RBs) included in the codeblock may be indicated by a bundle size (e.g., one RB per codeblock, two RBs per codeblock, three RBs per codeblock, and so on), which may be configured. A codeblock may be encoded to add parity bits, which may be used for error correction. When codeblocks are interleaved, codeblocks that are adjacent to one another in the VRB domain may be non-adjacent in the PRB domain.

As shown by reference number 305, one example interleaving mode is a non-interleaved mode (shown as NI mode). Using the non-interleaved mode, when a transmitter (e.g., a UE 120, a base station 110, and/or the like) maps VRBs to PRBs, the VRBs are not interleaved. In this case, VRBs are transmitted in PRBs in a same order as the VRB allocation. As a result, codeblocks and/or RBs that are adjacent to one another in the VRB domain may also be adjacent to one another in the PRB domain. During VRB to PRB mapping, a starting PRB may be allocated, and the VRBs may be mapped to PRBs starting with the starting PRB. For example, if the starting PRB is PRB 100, then VRBs 0 through 9 may be mapped to PRBs 100 through 109. When interleaving is not applied (e.g., in the non-interleaved mode), VRB 0 is mapped to PRB 100, VRB 1 is mapped to PRB 101, VRB 2 is mapped to PRB 102, and so on, as shown.

As shown by reference number 310, another example interleaving mode is an interleaving mode that interleaves VRBs (e.g., all VRBs) regardless of whether those VRBs are allocated to a wireless communication device to which those VRBs are transmitted. This interleaving mode may be referred to as an out-of-allocation interleaving mode (shown as OOA mode). The out-of-allocation interleaving mode may apply an algorithm specified in Release 15 of the 3GPP wireless communication standard to map VRBs to PRBs, and thus may also be referred to as a Release 15 (or Rel-15) interleaving mode. Using the out-of-allocation interleaving mode, VRB-to-PRB mapping is performed across a bandwidth part (BWP) that includes the PRBs (e.g., a BWP configured for the receiver), rather than across a set of PRBs allocated to the receiver (which may be a portion of the BWP). As a result, when a transmitter (e.g., a base station 110, a UE 120, and/or the like) maps VRBs to PRBs using the out-of-allocation interleaving mode, the VRBs are interleaved regardless of whether those VRBs are allocated to a receiver (e.g., a UE 120). In example 300, VRBs 10 through 19, which are not allocated to a receiver, are interleaved because the corresponding PRBs are included in the BWP configured for the receiver (e.g., the BWP includes PRBs 100 through 119, corresponding to VRBs 0 through 19). For example, VRBs 2, 3, 6, and 7 may be mapped to PRBs 110, 111, 112, and 113, respectively, which may not be allocated to the receiver. In this example, PRBs 100 through 109 are allocated to the receiver. The out-of-allocation interleaving mode makes frequency division multiplexing of simultaneous communications for multiple UEs 120 difficult.

As shown by reference number 315, another example interleaving mode is an interleaving mode that interleaves only VRBs that are allocated to a wireless communication device to which those VRBs are transmitted. This interleaving mode may be referred to as an in-allocation interleaving mode (shown as IA mode). Using the in-allocation interleaving mode, VRB-to-PRB mapping is performed across a set of PRBs allocated to a receiver (which may be a portion of the BWP), rather than across a bandwidth part (BWP) that includes the PRBs (e.g., a BWP configured for the receiver). As a result, when a transmitter (e.g., a base station 110, a UE 120, and/or the like) maps VRBs to PRBs using the in-allocation interleaving mode, only the VRBs that are allocated to a receiver (e.g., a UE 120) are interleaved. In example 300, VRBs 10 through 19, which are not allocated to the receiver, are not interleaved because the corresponding PRBs are included in the BWP configured for the receiver (e.g., the BWP includes PRBs 100 through 119, corresponding to VRBs 0 through 19).

Example 300 is an example allocation of VRBs and PRBs. As shown by reference number 320, other allocations may differ from example 300.

As indicated above, FIG. 3 is provided merely as an example. Other examples may differ from what is described with regard to FIG. 3. In these examples, a bundle size of 2 is used for VRB to PRB mapping, meaning that two VRBs are included in a codeblock.

Figure 4:
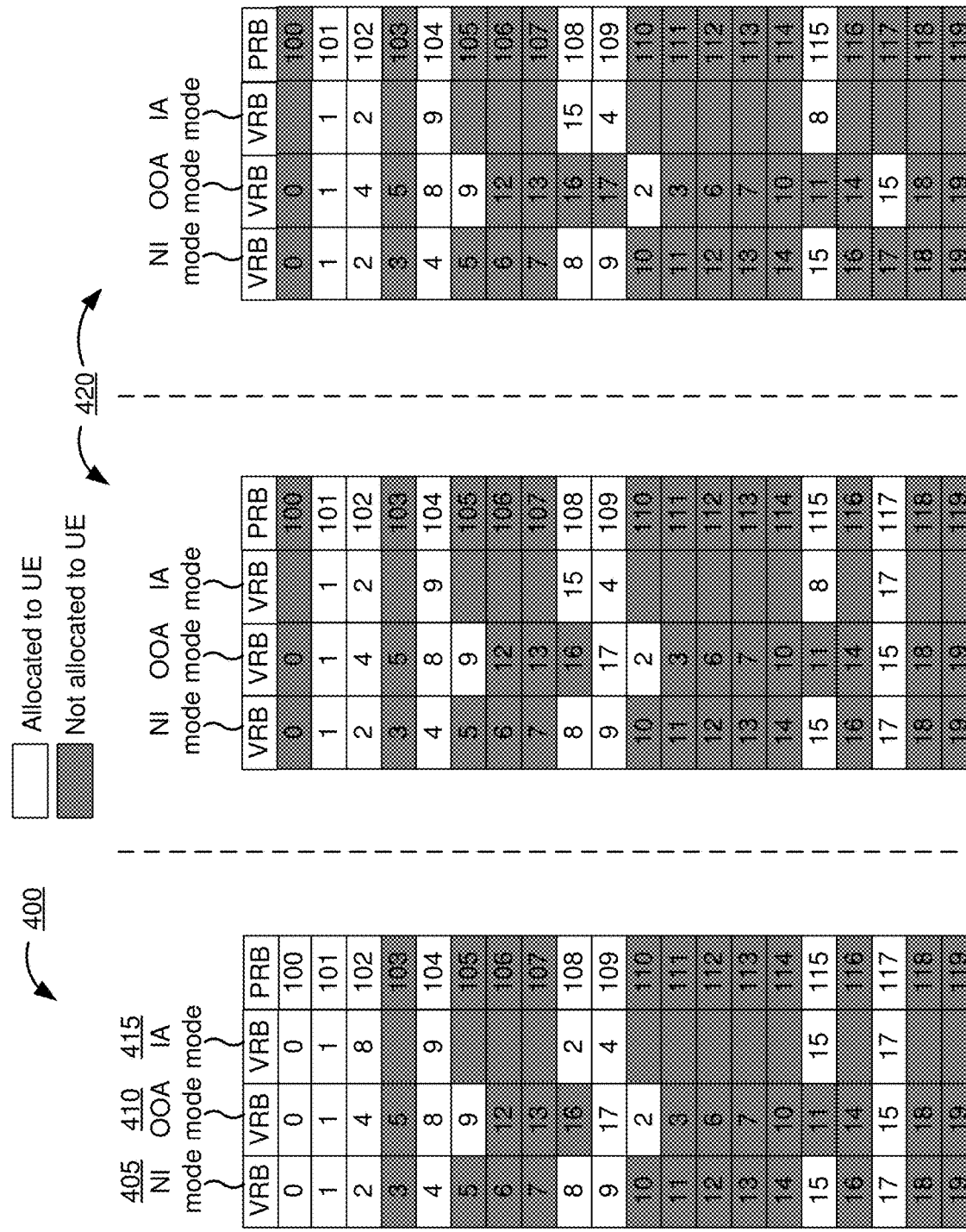

FIG. 4 is a diagram illustrating an example 400 of different interleaving modes, in accordance with various aspects of the present disclosure. FIG. 4 shows interleaving modes for a non-contiguous VRB allocation (e.g., of VRBs 0, 1, 2, 4, 8, 9, 15, and 17), sometimes referred to as a Type 0 VRB allocation or a bitmap VRB allocation.

As shown by reference number 405, using the non-interleaved mode (shown as NI mode), when a transmitter (e.g., a UE 120, a base station 110, and/or the like) maps VRBs to PRBs, the VRBs are not interleaved. In this case, VRBs are transmitted in PRBs in a same order as the VRB allocation. As a result, codeblocks and/or RBs that are adjacent to one another in the VRB domain may also be adjacent to one another in the PRB domain. Additionally, or alternatively, an offset of a VRB from a starting VRB may be the same as an offset of a corresponding PRB, to which that VRB is mapped, from a starting PRB. For example, when interleaving is not applied (e.g., in the non-interleaved mode), VRB 0 is mapped to PRB 100, VRB 1 is mapped to PRB 101, VRB 2 is mapped to PRB 102, and so on, as shown.

As shown by reference number 410, using the out-of-allocation interleaving mode (shown as OOA mode), VRB-to-PRB mapping is performed across a BWP that includes the PRBs (e.g., a BWP configured for the receiver), rather than across a set of PRBs allocated to the receiver (which may be a portion of the BWP). In example 400, VRBs 3, 5, 6, 7, 10, 11, 12, 13, 14, 16, 18, and 19, which are not allocated to a receiver, are interleaved because the corresponding PRBs are included in the BWP configured for the receiver (e.g., the BWP includes PRBs 100 through 119, corresponding to VRBs 0 through 19). For example, VRBs 9 and 2 may be mapped to PRBs 105 and 110, respectively, which may not be allocated to the receiver. In this example, PRBs 100, 101, 102, 104, 108, 109, 115, and 117 are allocated to the receiver. The out-of-allocation interleaving mode makes frequency division multiplexing of simultaneous communications for multiple UEs 120 difficult.

As shown by reference number 415, using the in-allocation interleaving mode (shown as IA mode), VRB-to-PRB mapping is performed across a set of PRBs allocated to a receiver (which may be a portion of the BWP), rather than across a BWP that includes the PRBs (e.g., a BWP configured for the receiver). In example 400, VRBs 3, 5, 6, 7, 10, 11, 12, 13, 14, 16, 18, and 19, which are not allocated to the receiver, are not interleaved because the corresponding PRBs are included in the BWP configured for the receiver (e.g., the BWP includes PRBs 100 through 119, corresponding to VRBs 0 through 19).

With multiple possible interleaving modes, communications between a UE 120 and a base station 110 may fail if the UE 120 and the base station 110 do not communicate the type of interleaving mode being used. In some cases, different interleaving modes may be used for different communications, such as communications that occur at different times, different types of communications, and/or the like. Furthermore, an interleaving mode may be used for different purposes, such as to perform VRB to PRB mapping for downlink data communications, to perform VRB to PRB mapping for uplink data communications, to estimate channel state information (CSI) (e.g., where different CSI may be reported assuming different interleaving modes), and/or the like. Some techniques and apparatuses described herein permit effective and efficient configuration and signaling of different interleaving modes to be used in different scenarios (e.g., for different communications, for different purposes, and/or the like).

Example 400 is an example allocation of VRBs and PRBs. As shown by reference number 420, other allocations may differ from example 400. In these examples, a bundle size of 2 is used for VRB to PRB mapping, meaning that two VRBs are included in a codeblock.

As indicated above, FIG. 4 is provided merely as an example. Other examples may differ from what is described with regard to FIG. 4.

Figure 5:
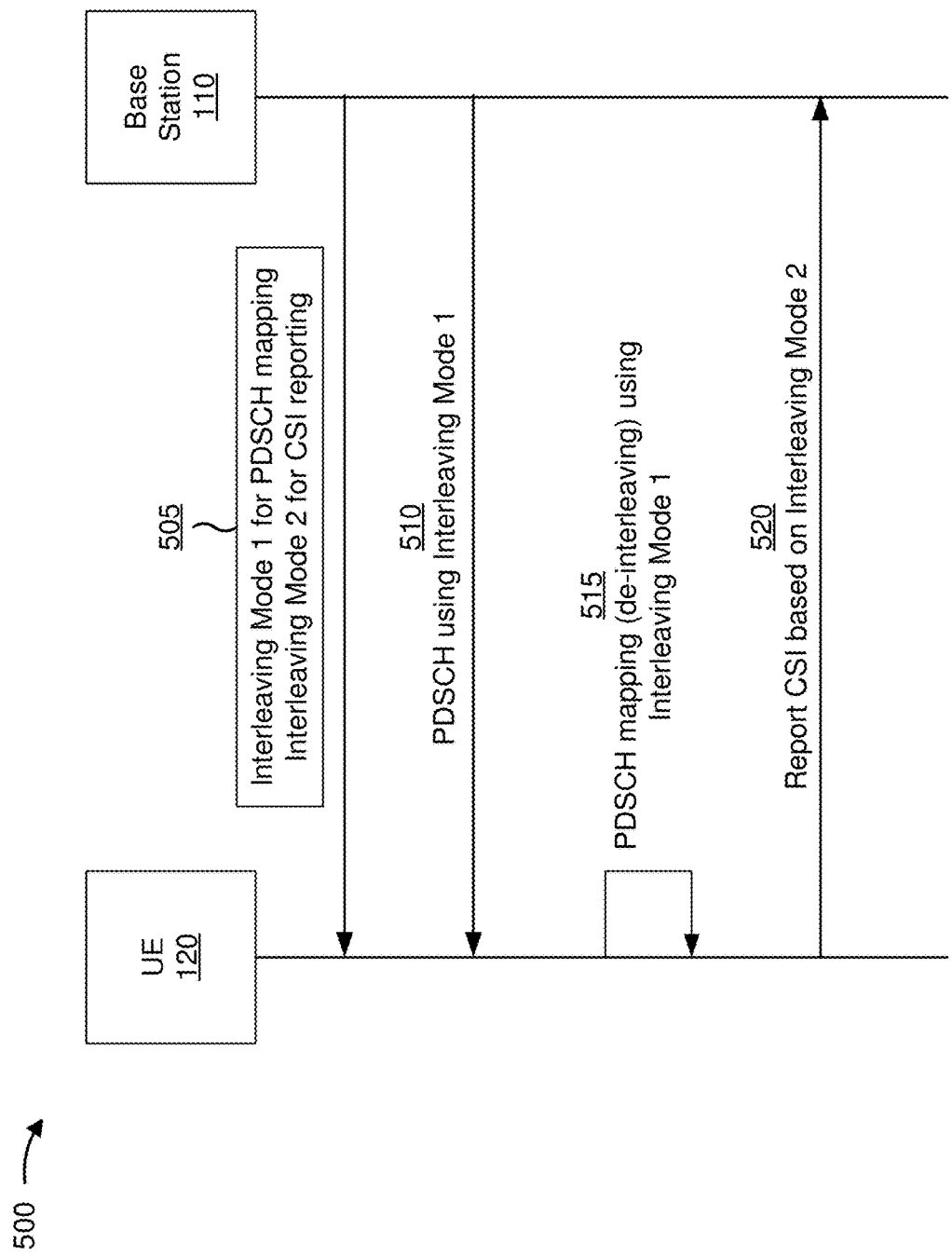
FIGS. 5-9 are diagrams illustrating examples of configuring and signaling an interleaving mode that includes in-allocation interleaving, in accordance with various aspects of the present disclosure.

FIG. 5 is a diagram illustrating an example 500 of configuring and signaling an interleaving mode that includes in-allocation interleaving, in accordance with various aspects of the present disclosure. As shown in FIG. 5, a UE 120 and a base station 110 may communicate with one another.

As shown by reference number 505, the base station 110 may transmit, to the UE 120, an indication of a first interleaving mode (shown as interleaving mode 1) for mapping codeblocks to a data channel (e.g., a downlink data channel, such as a physical downlink shared channel (PDSCH)) and/or a second interleaving mode (shown as interleaving mode 2) for reporting CSI. In some aspects, the indication may be transmitted in a radio resource control (RRC) message, such as an RRC configuration message, an RRC reconfiguration message, and/or the like. Additionally, or alternatively, the indication may be transmitted in downlink control information (DCI) (e.g., a downlink grant for PDSCH). In some aspects, the indication may be transmitted using both an RRC message and DCI. As shown, the first interleaving mode may be used for PDSCH mapping, such as for mapping VRBs (e.g., a set of codeblocks that each include one or more VRBs) to PRBs for PDSCH communications. The second interleaving mode may be used for estimating and/or reporting CSI.

In some aspects, the base station 110 may indicate that the same interleaving mode is to be used for PDSCH mapping (e.g., the first interleaving mode) and for CSI reporting (e.g., the second interleaving mode). In some aspects, the base station 110 may indicate different interleaving modes for PDSCH mapping (e.g., the first interleaving mode) and CSI reporting (e.g., the second interleaving mode). The first interleaving mode and/or the second interleaving mode may include the non-interleaved mode, the out-of-allocation interleaving mode, and/or the in-allocation interleaving mode, as described above in connection with FIGS. 3-4. For example, the base station 110 may select from the non-interleaved mode, the out-of-allocation interleaving mode, and the in-allocation interleaving mode when selecting the first interleaving mode. Additionally, or alternatively, the base station 110 may select from the non-interleaved mode, the out-of-allocation interleaving mode, and the in-allocation interleaving mode when selecting the second interleaving mode. Additional details regarding signaling of interleaving modes are described below in connection with FIGS. 6 and 7.

In some aspects, the base station 110 may indicate one of the interleaving modes, and the other interleaving mode may be fixed (e.g., according to a wireless communication standard) and/or stored in memory of the UE 120. For example, the base station 110 may indicate the first interleaving mode, and the second interleaving mode may be fixed and/or stored in memory of the UE 120. Additionally, or alternatively, the UE 120 may store a rule that indicates a manner in which the second interleaving mode is to be determined or derived from the first interleaving mode. In this case, the base station 110 may indicate the first interleaving mode, and the UE 120 may determine the second interleaving mode based at least in part on the first interleaving mode indicated by the base station 110 (e.g., using the rule).

As shown by reference number 510, the base station 110 may transmit a PDSCH communication to the UE 120. The base station 110 may generate the PDSCH communication by mapping codeblocks to PRBs of the PDSCH using the first interleaving mode (e.g., indicated to the UE 120).

As shown by reference number 515, the UE 120 may perform PDSCH mapping using the first interleaving mode (e.g., indicated to the UE 120). The UE 120 may determine a PDSCH mapping scheme used to map codeblocks to the PDSCH based at least in part on the indication from the base station (e.g., the first interleaving mode), and may use that PDSCH mapping scheme to de-interleave the PDSCH communication (e.g., to recover the in-order codeblocks).

As shown by reference number 520, the UE 120 may report CSI to the base station 110 based at least in part on the second interleaving mode (e.g., indicated to the UE 120). When estimating CSI for a channel (e.g., a channel quality indicator (CQI) value, a rank indicator (RI), and/or the like), the UE 120 may base the CSI estimate on the type of interleaving to be used for the channel. For example, if interleaving is used (e.g., an out-of-allocation interleaving mode or an in-allocation interleaving mode), then the UE 120 may report more optimistic CSI as compared to if interleaving is not used (e.g., a non-interleaved mode). By indicating an interleaving mode for CSI reporting, the base station 110 may be able to properly interpret a CSI report received from the UE 120 and select an appropriate resource allocation, modulation and coding scheme (MCS), rank, and/or the like for a subsequent PDSCH communication.

As indicated above, FIG. 5 is provided as an example. Other examples may differ from what is described with respect to FIG. 5.

Figure 6:
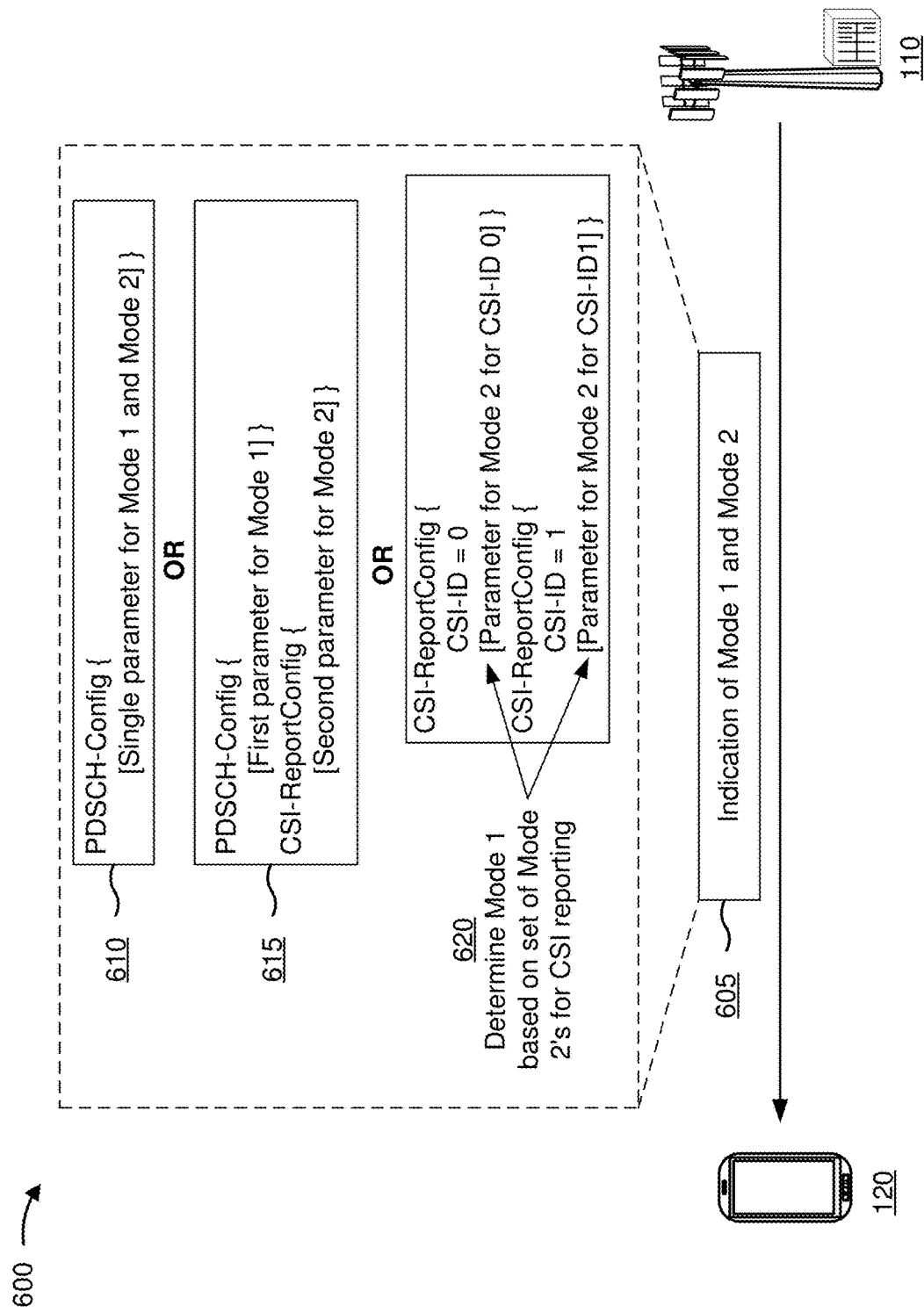

FIG. 6 is a diagram illustrating another example 600 of configuring and signaling an interleaving mode that includes in-allocation interleaving, in accordance with various aspects of the present disclosure. FIG. 6 shows details of indicating one or more interleaving modes to a UE 120, such as in connection with reference number 505 of FIG. 5.

As shown by reference number 605, a base station 110 may transmit an indication of a first interleaving mode (e.g., for PDSCH mapping) and/or a second interleaving mode (e.g., for CSI reporting) to a UE 120, as described above in connection with reference number 505 of FIG. 5. The base station 110 and the UE 120 may use different signaling techniques for this indication, as described below.

As shown by reference number 610, in some aspects, the first interleaving mode and the second interleaving mode are indicated using a single parameter in an RRC message. In this case, the first interleaving mode and the second interleaving mode may be the same. Alternatively, the first interleaving mode and the second interleaving mode may be different if a value of the parameter represents an index that maps to a combination of interleaving modes to be used for the first interleaving mode and the second interleaving mode. As an example, a single parameter (e.g., an in-allocation-vrb-2-prb-interleaving parameter) in a PDSCH configuration (PDSCH-Config) information element may be used to indicate both the first interleaving mode for PDSCH mapping and the second interleaving mode for CSI reporting.

Alternatively, as shown by reference number 615, the first interleaving mode may be indicated using a first parameter in an RRC message and the second interleaving mode may be indicated using a second parameter in the RRC message. For example, a first parameter (e.g., an in-allocation-vrb-2-prb-interleaving parameter) in a PDSCH configuration (PDSCH-Config) information element may be used to indicate the first interleaving mode for PDSCH mapping. Additionally, or alternatively, a second parameter (e.g., an assumed-in-allocation-vrb-2-prb-interleaving parameter) in a CSI report configuration (CSI-ReportConfig) information element may be used to indicate the second interleaving mode for CSI reporting. In some aspects, the base station 110 may configure multiple CSI reports (e.g., using the same or different resources for transmission for CSI reference signals (CSI-RSs)). In this case, different CSI reports may be configured with the same interleaving mode or with different interleaving modes.

Alternatively, as shown by reference number 620, the second interleaving mode may be explicitly indicated in an RRC message, and the first interleaving mode may be implicitly indicated in the RRC message. In some aspects, the first interleaving mode may be implicitly indicated based at least in part on a set of interleaving modes configured in the RRC message for a corresponding set of CSI reports. For example, a set of second interleaving modes may be indicated for CSI reporting (e.g., one interleaving mode per CSI report). In FIG. 6, a first CSI report with a CSI identity (ID) of 0 is configured with a corresponding interleaving mode, and a second CSI report with a CSI ID of 1 is configured with a corresponding interleaving mode.

In some aspects, if all of the CSI reports configured in the RRC message are configured with the in-allocation interleaving mode, then the UE 120 may determine that the interleaving mode for PDSCH mapping is also the in-allocation interleaving mode. In this case, if all of the CSI reports are not configured with an in-allocation interleaving mode (e.g., if at least one of the CSI reports is not configured with the in-allocation interleaving mode), then the UE 120 may determine that the interleaving mode for PDSCH mapping is the non-interleaved mode.

Alternatively, if any of the CSI reports configured in the RRC message are configured with the in-allocation interleaving mode, then the UE 120 may determine that the interleaving mode for PDSCH mapping is also the in-allocation interleaving mode. In this case, if none of the CSI reports are configured with an in-allocation interleaving mode, then the UE 120 may determine that the interleaving mode for PDSCH mapping is the non-interleaved mode.

In some aspects, the RRC message may indicate, for the first interleaving mode, an interleaving mode to be used when interleaving is enabled, and DCI may indicate whether interleaving is enabled or disabled for mapping codeblocks to the data channel. In this case, if interleaving is enabled via DCI, then the UE 120 may use the interleaving mode indicated in the RRC message (e.g., in-allocation interleaving or out-of-allocation interleaving). If interleaving is disabled via DCI, then the UE 120 may use the non-interleaved mode. Additional details regarding using DCI to signal an interleaving mode are described below in connection with FIG. 7.

As indicated above, FIG. 6 is provided as an example. Other examples may differ from what is described with respect to FIG. 6.

Figure 7:
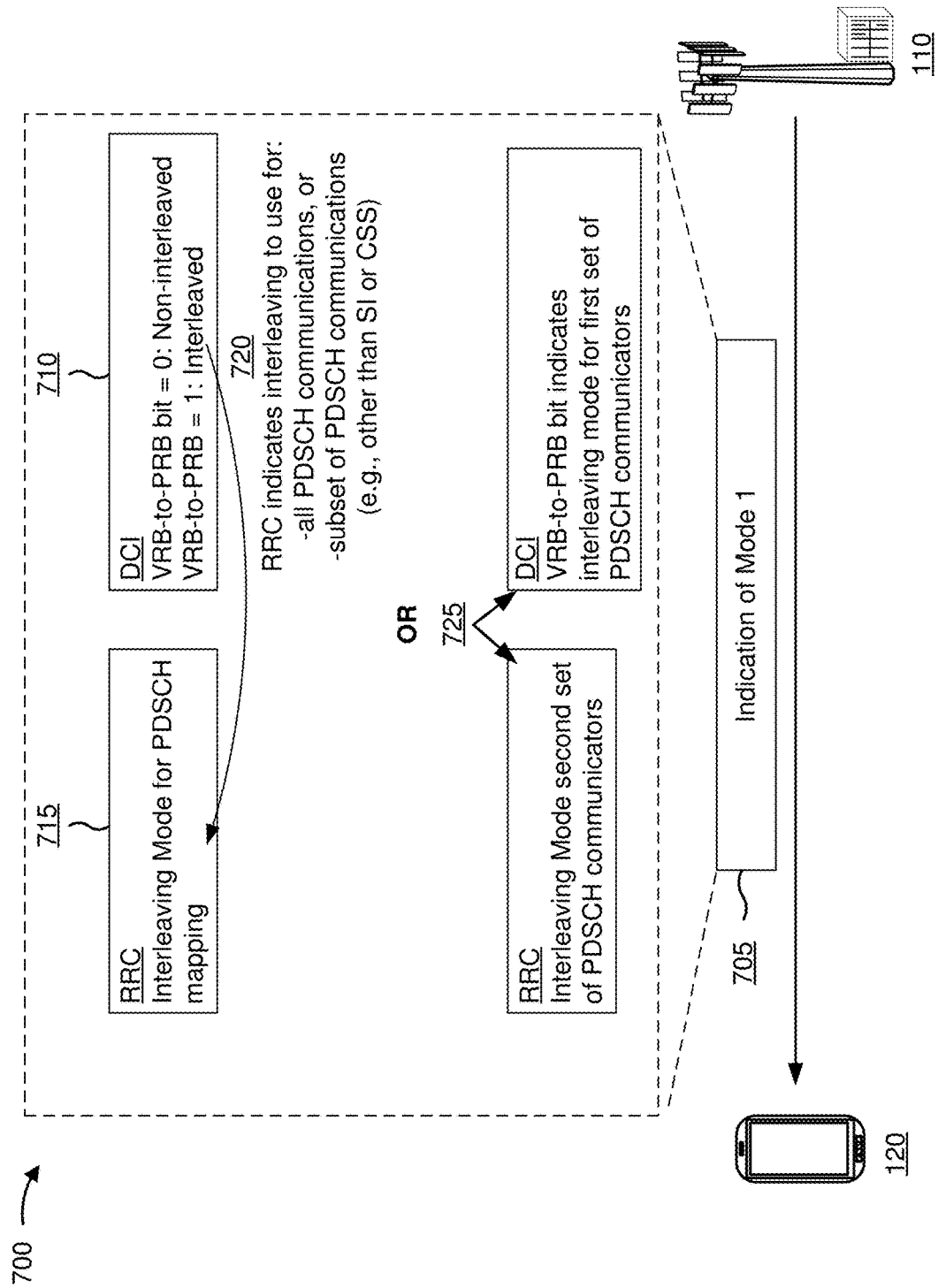

FIG. 7 is a diagram illustrating another example 700 of configuring and signaling an interleaving mode that includes in-allocation interleaving, in accordance with various aspects of the present disclosure. FIG. 7 shows details of indicating one or more interleaving modes to a UE 120, such as in connection with reference number 505 of FIG. 5.

As shown by reference number 705, a base station 110 may transmit an indication of a first interleaving mode (e.g., for PDSCH mapping) to a UE 120, as described above in connection with reference number 505 of FIG. 5. The base station 110 and the UE 120 may use different signaling techniques for this indication, as described below. As described elsewhere herein, in some aspects, the base station 110 may additionally or alternatively transmit an indication of a second interleaving mode (e.g., for CSI reporting) to the UE 120. However, FIG. 7 describes details of indicating the first interleaving mode using an RRC message and/or DCI.

As shown by reference number 710, in some aspects, the base station 110 may indicate, in DCI, an interleaving mode to be used for a PDSCH communication scheduled by the DCI. In some aspects, the indication in DCI may be a single bit, such as a VRB-to-PRB bit (e.g., a VRB-to-PRB mapping bit). As shown, a first value of the bit (e.g., zero) may indicate that the interleaving mode is the non-interleaved mode, and a second value of the bit (e.g., one) may indicate that the interleaving mode uses interleaving. As shown by reference number 715, the type of interleaving to be used when the bit is set to the second value may be indicated in an RRC message. For example, the RRC message may indicate whether to use the in-allocation interleaving mode or the out-of-allocation interleaving mode for PDSCH mapping when the bit is set to the second value.

As shown by reference number 720, the interleaving mode indicated in the RRC message may be used for all PDSCH communications or may be used for a subset of PDSCH communications. If the interleaving mode indicated in the RRC message is used for a subset of PDSCH communications, then a first type of interleaving may be used for a first set of PDSCH communications and a second type of interleaving may be used for a second set of PDSCH communications.

For example, the out-of-allocation interleaving mode may be used for system information, one or more system information blocks (SIBs), SIB1, a PDSCH communication scheduled by DCI having format 1_0 with a cyclic redundancy check (CRC) scrambled using a system information radio network temporary identifier (SI-RNTI) in a Type0 physical downlink control channel (PDCCH) common search space (CSS) in a control resource set (CORESET) with a CORESET ID of zero. In this way, system information (e.g., SIB1) may be interleaved using the out-of-allocation interleaving mode for backward compatibility with legacy UEs 120. In this case, the in-allocation interleaving mode may be used for PDSCH communications other than system information (e.g., other than a SIB, other than SIB1, other than a PDSCH communication scheduled by DCI having format 1_0 with a CRC scrambled using an SI-RNTI in a Type0-PDCCH CSS in a CORESET 0, and/or the like).

As another example, the out-of-allocation interleaving mode may be used for system information (e.g., one or more SIBs, SIB1, a PDSCH communication scheduled by DCI having format 1_0 with a CRC scrambled using a SI-RNTI in a Type0-PDCCH CSS in a CORESET 0, and/or the like) and for PDSCH communications scheduled using DCI (e.g., having format 1_0) in a common search space. In this way, broadcast communications transmitted to multiple UEs 120 may be interleaved using the out-of-allocation interleaving mode for backward compatibility with legacy UEs 120. In this case, the in-allocation interleaving mode may be used for PDSCH communications other than system information (e.g., other than a SIB, other than SIB1, other than a PDSCH communication scheduled by DCI having format 1_0 with a CRC scrambled using a SI-RNTI in a Type0-PDCCH CSS in a CORESET 0, and/or the like) and other than PDSCH communications scheduled using DCI (e.g., having format 1_0) in a common search space.

Alternatively, as shown by reference number 725, an interleaving mode for PDSCH mapping for a first set of communications may be indicated in DCI, and an interleaving mode for PDSCH mapping for a second set of communications may be indicated in an RRC message. In some aspects, the first set of communications includes system information (as described above), and the second set of communications includes communications other than system information. In some aspects, the first set of communications includes system information (as described above) and PDSCH communications scheduled using DCI (e.g., having format 1_0) in a common search space, and the second set of communications includes PDSCH communications other than system information and other than PDSCH communications scheduled using DCI (e.g., having format 1_0) in a common search space. In this case, a first value of the bit in DCI may indicate that the non-interleaved mode is to be used for system information and/or PDSCH communications scheduled using DCI in a common search space, and a second value of the bit in DCI may indicate that the out-of-allocation interleaved mode is to be used for system information and/or PDSCH communications scheduled using DCI in a common search space.

In this case, the RRC message may indicate whether PDSCH communications, other than system information and/or PDSCH communications scheduled using DCI in a common search space, are to use the non-interleaved mode, the out-of-allocation interleaving mode, or the in-allocation interleaved mode. In some aspects, if a single bit is used in the RRC message for this indication in the RRC message, then a first value of the bit may indicate that the in-allocation interleaving mode is to be used, and a second value of the bit may indicate that the out-of-allocation interleaving mode is to be used. Alternatively, if a single bit is used in the RRC message for this indication, then a first value of the bit may indicate that the in-allocation interleaving mode is to be used, and a second value of the bit may indicate that the non-interleaved mode is to be used.

In some aspects, an interleaving mode for the first set of communications and/or the second set of communications may be indicated using both DCI and an RRC message. For example, a first bit value in DCI may indicate a non-interleaved mode, and a second bit value in the DCI may indicate an interleaving mode identified in the RRC message. In some aspects, an interleaving mode for the first set of communications may be indicated using only DCI (and not an RRC message). For example, a first bit value in DCI may indicate a non-interleaved mode and a second bit value in DCI may indicate an out-of-allocation interleaving mode. In some aspects, an interleaving mode for the second set of communications may be indicated using only an RRC message (and not DCI). In this case, the value of the bit in DCI may be ignored or overridden by the indication in the RRC message for the second set of communications.

As indicated above, FIG. 7 is provided as an example. Other examples may differ from what is described with respect to FIG. 7.

Figure 8:
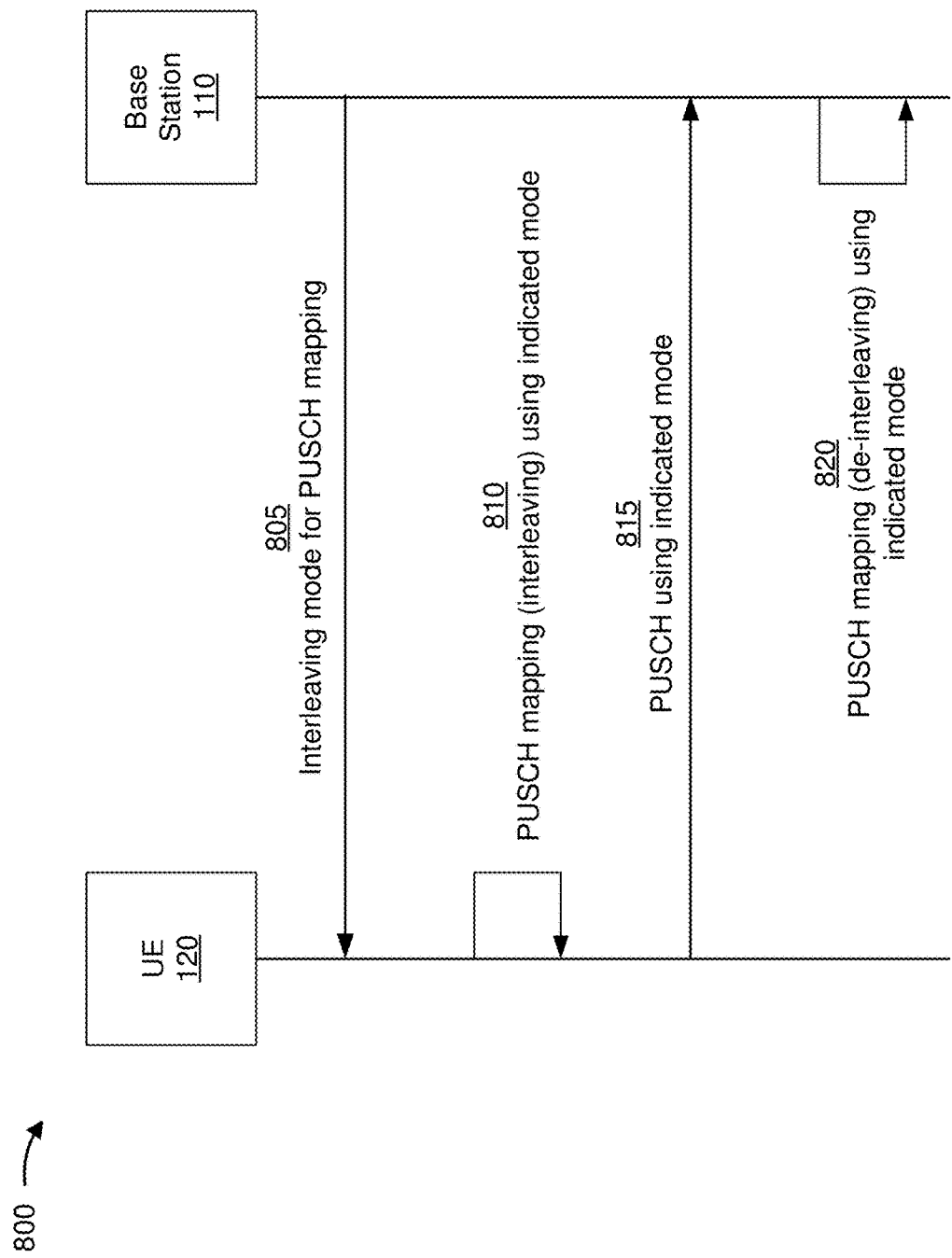

FIG. 8 is a diagram illustrating another example 800 of configuring and signaling an interleaving mode that includes in-allocation interleaving, in accordance with various aspects of the present disclosure. As shown in FIG. 8, a UE 120 and a base station 110 may communicate with one another.

As shown by reference number 805, the base station 110 may transmit, to the UE 120, an indication of an interleaving mode for mapping codeblocks to a data channel. As shown, the data channel may be an uplink data channel, such as a physical uplink shared channel (PUSCH). In some aspects, the interleaving mode for PUSCH mapping may be indicated without indicating an interleaving mode for PDSCH mapping and/or for CSI reporting (as described above in connection with FIG. 5). In some aspects, the interleaving mode for PUSCH mapping may be indicated in addition to indicating an interleaving mode for PDSCH mapping and/or for CSI reporting (as described above in connection with FIG. 5). In some aspects, the indication may be transmitted in an RRC message. Additionally, or alternatively, the indication may be transmitted in DCI (e.g., an uplink grant for the PUSCH). In some aspects, the indication may be transmitted using both an RRC message and DCI. As shown, the interleaving mode may be used for PUSCH mapping, such as for mapping VRBs (e.g., a set of codeblocks that each include one or more VRBs) to PRBs for PUSCH communications. As described elsewhere herein, the interleaving mode may include the non-interleaved mode, the out-of-allocation interleaving mode, and/or the in-allocation interleaving mode, as described above in connection with FIGS. 3-4.

As shown by reference number 810, the UE 120 may perform PUSCH mapping using the interleaving mode (e.g., indicated to the UE 120). The UE 120 may determine a PUSCH mapping scheme to be used to map codeblocks to the PUSCH based at least in part on the indication from the base station (e.g., the interleaving mode), and may use that PUSCH mapping scheme to interleave the PUSCH communication (e.g., to transmit codeblocks in appropriate PRBs).

As shown by reference number 815, the UE 120 may transmit a PUSCH communication to the base station 110. The UE 120 may generate the PUSCH communication by mapping codeblocks to PRBs of the PUSCH using the interleaving mode (e.g., indicated to the UE 120). As shown by reference number 820, the base station 110 may recover the codeblocks (e.g., using de-interleaving) according to the indicated interleaving mode.

In some aspects, the interleaving mode may be indicated in a similar manner as described above in connection with FIG. 6 and/or FIG. 7, except that PUSCH communications do not include system information or communications scheduled using DCI in a common search space. In some aspects, the interleaving mode for PUSCH mapping is a non-interleaved mode if a bit in DCI is set to a first value, and the interleaving mode uses a first type of interleaving (e.g., out-of-allocation interleaving) or a second type of interleaving (e.g., in-allocation interleaving) if the bit in the DCI is set to a second value. In some aspects, an RRC message may indicate whether to use the first type of interleaving or the second type of interleaving when the DCI bit is set to the second value.

As indicated above, FIG. 8 is provided as an example. Other examples may differ from what is described with respect to FIG. 8.

Figure 9:
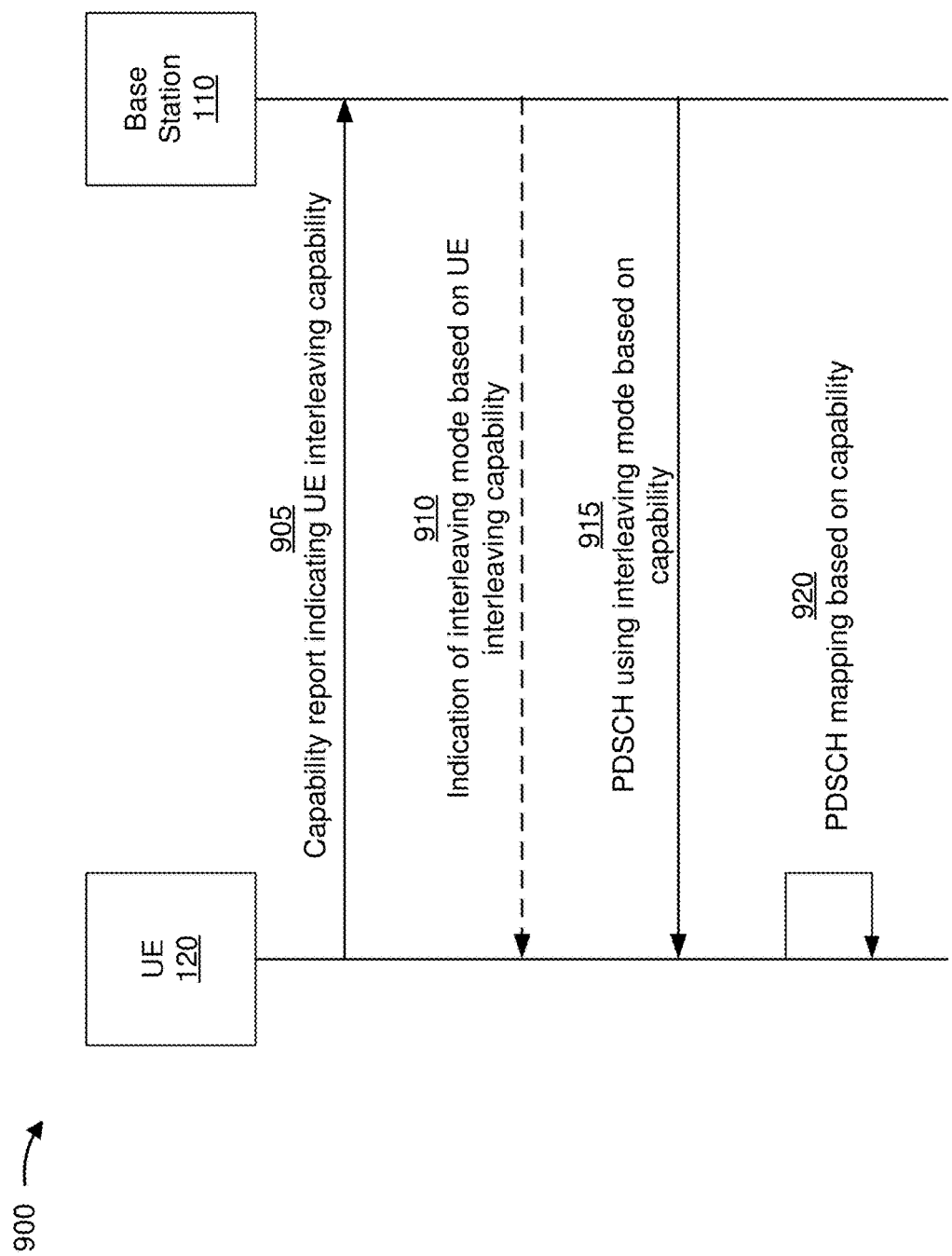

FIG. 9 is a diagram illustrating another example 900 of configuring and signaling an interleaving mode that includes in-allocation interleaving, in accordance with various aspects of the present disclosure. As shown in FIG. 9, a UE 120 and a base station 110 may communicate with one another.

As shown by reference number 905, the UE 120 may transmit a capability report (e.g., a UE capability report) to the base station 110. The capability report may indicate an interleaving capability of the UE 120. The interleaving capability may indicate, for example, whether the UE 120 is capable of operating using the in-allocation interleaving mode. If the UE 120 is not capable of operating using the in-allocation interleaving mode, then this may indicate that the UE 120 is capable of operating using the out-of-allocation interleaving mode.

As shown by reference number 910, the base station 110 may transmit, to the UE 120, an indication of an interleaving mode to be used by the UE 120 (e.g., for PDSCH mapping, PUSCH mapping, CSI reporting, and/or the like), as described above in connection with FIGS. 5-8. In some aspects, the base station 110 may determine the interleaving mode to be indicated to the UE 120 based at least in part on the interleaving capability reported by the UE 120 in the capability report. For example, if the capability report indicates that the UE 120 is capable of using in-allocation interleaving, then the base station 110 may configure in-allocation interleaving in some aspects. As another example, if the capability report indicates that the UE 120 is not capable of using in-allocation interleaving, then the base station 110 may configure out-of-allocation interleaving in some aspects.

As shown by reference number 915, the base station 110 may transmit a PDSCH communication to the UE 120. The base station 110 may generate the PDSCH communication by mapping codeblocks to PRBs of the PDSCH using the interleaving mode indicated to the UE 120 (e.g., based at least in part on the interleaving capability of the UE 120), as described elsewhere herein.

As shown by reference number 920, the UE 120 may perform PDSCH mapping using the interleaving mode indicated to the UE 120 (e.g., based at least in part on the interleaving capability of the UE 120), as described elsewhere herein. The UE 120 may determine a PDSCH mapping scheme used to map codeblocks to the PDSCH based at least in part on the indication from the base station, and may use that PDSCH mapping scheme to de-interleave the PDSCH communication (e.g., to recover the in-order codeblocks). Although FIG. 9 shows PDSCH mapping using the indicated interleaving mode, the interleaving mode may be used for PUSCH mapping, CSI reporting, and/or the like, as described elsewhere herein. In some aspects, the base station 110 may indicate multiple interleaving modes for different operations (e.g., for PDSCH mapping, for PUSCH mapping, for CSI reporting, and/or the like) based at least in part on the interleaving capability of the UE 120. The UE 120 may perform one or more of these operation(s) in accordance with the indicated interleaving mode(s), as described elsewhere herein.

In some aspects, an interleaving mode for a first set of communications, such as system information (e.g., one or more SIBs, SIB1, a PDSCH communication scheduled by DCI having format 1_0 with a CRC scrambled using a SI-RNTI in a Type0-PDCCH CSS in a CORESET 0, and/or the like) and/or for PDSCH communications scheduled using DCI (e.g., having format 1_0) in a common search space, may be independent of the interleaving capability indicated by the UE 120. For example, a bit in DCI may indicate whether to use a non-interleaved mode or an out-of-allocation interleaving mode for the first set of communications regardless of a UE interleaving capability. Alternatively, in some aspects, the first set of communications may use a non-interleaved mode regardless of an indication in DCI and/or regardless of a UE interleaving capability.

In some cases, a communication that is a candidate for interleaving may occur before the UE interleaving capability is indicated to the base station 110 and/or before the base station 110 indicates an interleaving mode to be used by the UE 120. The communication may include, for example, a PDSCH communication that includes a UE capability enquiry (e.g., a request for the capability report), a PUSCH communication that includes the capability report, an RRC message transmitted prior to the capability report and/or the indication of the interleaving mode, and/or the like. In some aspects, a bit in DCI may indicate whether to use a non-interleaved mode or an out-of-allocation interleaving mode for the communication regardless of a UE interleaving capability. Alternatively, in some aspects, the communication may use a non-interleaved mode regardless of an indication in DCI and/or regardless of a UE interleaving capability.

As indicated above, FIG. 9 is provided as an example. Other examples may differ from what is described with respect to FIG. 9.

FIG. 10 is a diagram illustrating an example process 1000 performed, for example, by a UE, in accordance with various aspects of the present disclosure. Example process 1000 is an example where a UE (e.g., UE 120 and/or the like) performs operations associated with configuring and signaling an interleaving mode that includes in-allocation interleaving.

As shown in FIG. 10, in some aspects, process 1000 may include receiving an indication of at least one of a first interleaving mode for mapping codeblocks to a data channel or a second interleaving mode for reporting CSI (block 1010). For example, the UE (e.g., using receive processor 258, controller/processor 280, memory 282, and/or the like) may receive an indication of a first interleaving mode for mapping codeblocks to a data channel and/or a second interleaving mode for reporting CSI, as described above.

As further shown in FIG. 10, in some aspects, process 1000 may include mapping codeblocks to the data channel based at least in part on the first interleaving mode (block 1020). For example, the UE (e.g., using receive processor 258, transmit processor 264, controller/processor 280, memory 282, and/or the like) may map codeblocks to the data channel based at least in part on the first interleaving mode, as described above.

As further shown in FIG. 10, in some aspects, process 1000 may include reporting CSI based at least in part on the second interleaving mode (block 1030). For example, the UE (e.g., using transmit processor 264, controller/processor 280, memory 282, and/or the like) may report CSI based at least in part on the second interleaving mode, as described above.

Process 1000 may include additional aspects, such as any single aspect or any combination of aspects described below and/or in connection with one or more other processes described elsewhere herein.

In a first aspect, the first interleaving mode and the second interleaving mode are the same.

In a second aspect, alone or in combination with the first aspect, the first interleaving mode and the second interleaving mode are different.

In a third aspect, alone or in combination with one or more of the first and second aspects, the first interleaving mode and the second interleaving mode include at least one of a non-interleaved mode, an interleaving mode that interleaves VRBs regardless of whether those VRBs are allocated to the UE, or an interleaving mode that interleaves only VRBs that are allocated to the UE.

In a fourth aspect, alone or in combination with one or more of the first through third aspects, the indication is included in at least one of a radio resource control message, downlink control information, or a combination thereof.

In a fifth aspect, alone or in combination with one or more of the first through fourth aspects, the first interleaving mode and the second interleaving mode are indicated using a single parameter in a radio resource control message.

In a sixth aspect, alone or in combination with one or more of the first through fifth aspects, the first interleaving mode is indicated using a first parameter in a radio resource control message and the second interleaving mode is indicated using a second parameter in the radio resource control message.

In a seventh aspect, alone or in combination with one or more of the first through sixth aspects, the second interleaving mode is explicitly indicated in a radio resource control message, and the first interleaving mode is implicitly indicated in the radio resource control message based at least in part on a set of interleaving modes configured in the radio resource control message for a corresponding set of CSI reports.

In an eighth aspect, alone or in combination with one or more of the first through seventh aspects, the UE is configured to determine that the first interleaving mode is an in-allocation interleaving mode if all CSI reports, in the set of CSI reports indicated in the radio resource control message, are configured with the in-allocation interleaving mode.

In a ninth aspect, alone or in combination with one or more of the first through eighth aspects, the UE is configured to determine that the first interleaving mode is an in-allocation interleaving mode if any CSI report, in the set of CSI reports indicated in the radio resource control message, is configured with the in-allocation interleaving mode.

In a tenth aspect, alone or in combination with one or more of the first through ninth aspects, a radio resource control message indicates, for the first interleaving mode, an interleaving mode to be used when interleaving is enabled, and downlink control information indicates whether interleaving is enabled or disabled for mapping codeblocks to the data channel.

In an eleventh aspect, alone or in combination with one or more of the first through tenth aspects, the first interleaving mode is a non-interleaved mode if a bit in downlink control information is set to a first value, and the first interleaving mode uses a first type of interleaving for a first set of communications and a second type of interleaving for a second set of communications if the bit in the downlink control information is set to a second value.

In a twelfth aspect, alone or in combination with one or more of the first through eleventh aspects, the first type of interleaving interleaves all virtual resource blocks (VRBs) regardless of whether those VRBs are allocated to the UE, and the second type of interleaving interleaves only VRBs that are allocated to the UE.

In a thirteenth aspect, alone or in combination with one or more of the first through twelfth aspects, the first interleaving mode is indicated in a radio resource control message if the bit in the downlink control information is set to the second value.

In a fourteenth aspect, alone or in combination with one or more of the first through thirteenth aspects, the first set of communications include system information, and the second set of communications include communications other than system information.

In a fifteenth aspect, alone or in combination with one or more of the first through fourteenth aspects, the first set of communications include system information and communications scheduled using downlink control information in a common search space, and the second set of communications include communications other than system information and communications scheduled using downlink control information in the common search space.

In a sixteenth aspect, alone or in combination with one or more of the first through fifteenth aspects, the first interleaving mode is indicated in downlink control information for at least one of system information or communications scheduled using downlink control information in a common search space, and the first interleaving mode is indicated in a radio resource control message for communications other than the at least one of system information or communications scheduled using downlink control information in the common search space.

In a seventeenth aspect, alone or in combination with one or more of the first through sixteenth aspects, the first interleaving mode indicated in the downlink control information is either a non-interleaved mode or an interleaving mode that interleaves VRBs regardless of whether those VRBs are allocated to the UE.

In an eighteenth aspect, alone or in combination with one or more of the first through seventeenth aspects, the first interleaving mode indicated in the radio resource control message is either a non-interleaved mode, an interleaving mode that interleaves VRBs regardless of whether those VRBs are allocated to the UE, or an interleaving mode that interleaves only VRBs that are allocated to the UE.

In a nineteenth aspect, alone or in combination with one or more of the first through eighteenth aspects, the first interleaving mode indicated in the radio resource control message is either an interleaving mode that interleaves VRBs regardless of whether those VRBs are allocated to the UE or an interleaving mode that interleaves only VRBs that are allocated to the UE.

In a twentieth aspect, alone or in combination with one or more of the first through nineteenth aspects, the first interleaving mode indicated in the radio resource control message is either a non-interleaved mode or an interleaving mode that interleaves only virtual resource blocks that are allocated to the UE.

In a twenty-first aspect, alone or in combination with one or more of the first through twentieth aspects, the first interleaving mode is indicated using only downlink control information for system information, and the first interleaving mode is indicated using only a radio resource control message for communications other than system information.

In a twenty-second aspect, alone or in combination with one or more of the first through twenty-first aspects, the data channel is a downlink data channel, and mapping the codeblocks to the data channel comprises de-interleaving codeblocks received via the downlink data channel based at least in part on the first interleaving mode.

In a twenty-third aspect, alone or in combination with one or more of the first through twenty-second aspects, the data channel is an uplink data channel, and mapping the codeblocks to the data channel comprises interleaving codeblocks for transmission via the uplink data channel based at least in part on the first interleaving mode.

In a twenty-fourth aspect, alone or in combination with one or more of the first through twenty-third aspects, the first interleaving mode is a non-interleaved mode if a bit in downlink control information is set to a first value, and the first interleaving mode uses a first type of interleaving or a second type of interleaving if the bit in the downlink control information is set to a second value.

In a twenty-fifth aspect, alone or in combination with one or more of the first through twenty-fourth aspects, the first type of interleaving interleaves all VRBs regardless of whether those VRBs are allocated to the UE, and the second type of interleaving interleaves only VRBs that are allocated to the UE.

In a twenty-sixth aspect, alone or in combination with one or more of the first through twenty-fifth aspects, the first interleaving mode is indicated in a radio resource control message if the bit in the downlink control information is set to the second value.

In a twenty-seventh aspect, alone or in combination with one or more of the first through twenty-sixth aspects, process 1000 includes transmitting, to a base station, a capability report that indicates an interleaving capability of the UE; and receiving the indication from the base station based at least in part on transmitting the capability report that indicates the interleaving capability of the UE, and at least one of the first interleaving mode or the second interleaving mode is based at least in part on the interleaving capability of the UE.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

FIG. 11 is a diagram illustrating an example process 1100 performed, for example, by a UE, in accordance with various aspects of the present disclosure. Example process 1100 is an example where a UE (e.g., UE 120 and/or the like) performs operations associated with configuring and signaling an interleaving mode that includes in-allocation interleaving.

As shown in FIG. 11, in some aspects, process 1100 may include transmitting, to a base station, a capability report that indicates an interleaving capability of the UE, wherein the interleaving capability indicates whether the UE is capable of operating in an interleaving mode that interleaves only VRBs that are allocated to the UE (block 1110). For example, the UE (e.g., using transmit processor 264, controller/processor 280, memory 282, and/or the like) may transmit, to a base station, a capability report that indicates an interleaving capability of the UE, as described above. In some aspects, the interleaving capability indicates whether the UE is capable of operating in an interleaving mode that interleaves only VRBs that are allocated to the UE.

As further shown in FIG. 11, in some aspects, process 1100 may include mapping codeblocks to a data channel for one or more communications based at least in part on the interleaving capability (block 1120). For example, the UE (e.g., using receive processor 258, transmit processor 264, controller/processor 280, memory 282, and/or the like) may map codeblocks to a data channel for one or more communications based at least in part on the interleaving capability, as described above.

Process 1100 may include additional aspects, such as any single aspect or any combination of aspects described below and/or in connection with one or more other processes described elsewhere herein.

In a first aspect, the codeblocks are mapped to the data channel using an interleaving mode that interleaves only VRBs that are allocated to the UE when the interleaving capability indicates that the UE is capable of operating in the interleaving mode that interleaves only VRBs that are allocated to the UE.

In a second aspect, alone or in combination with the first aspect, the codeblocks are mapped to the data channel using an interleaving mode that interleaves VRBs regardless of whether those VRBs are allocated to the UE when the interleaving capability indicates that the UE is not capable of operating in the interleaving mode that interleaves only VRBs that are allocated to the UE.

In a third aspect, alone or in combination with one or more of the first and second aspects, codeblocks for system information are mapped to the data channel using an interleaving mode indicated in downlink control information.

In a fourth aspect, alone or in combination with one or more of the first through third aspects, codeblocks for system information are mapped to the data channel using a non-interleaved mode regardless of an indication in downlink control information.

In a fifth aspect, alone or in combination with one or more of the first through fourth aspects, codeblocks for communications that occur prior to transmission of the capability report are mapped to the data channel using an interleaving mode indicated in downlink control information.

In a sixth aspect, alone or in combination with one or more of the first through fifth aspects, codeblocks for communications that occur prior to transmission of the capability report are mapped to the data channel using a non-interleaved mode regardless of an indication in downlink control information.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
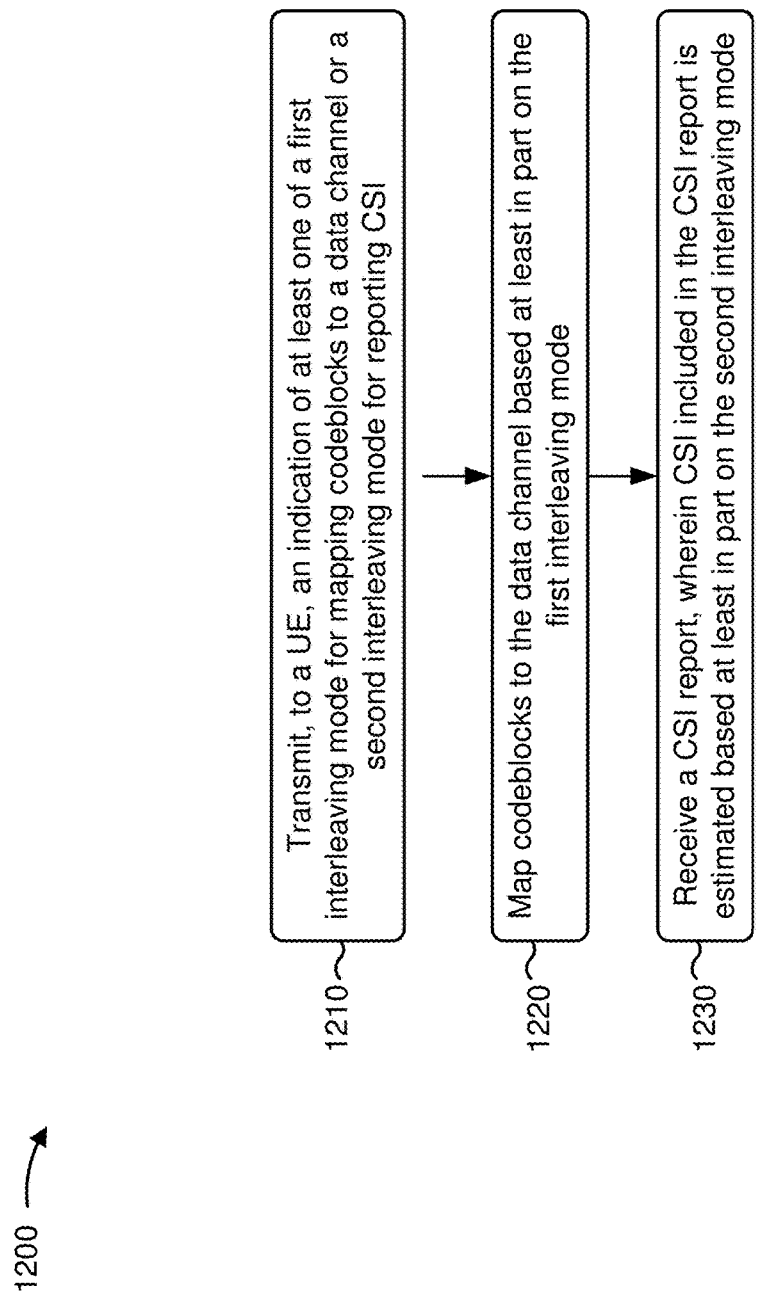

FIG. 12 is a diagram illustrating an example process 1200 performed, for example, by a base station, in accordance with various aspects of the present disclosure. Example process 1200 is an example where a base station (e.g., base station 110 and/or the like) performs operations associated with configuring and signaling an interleaving mode that includes in-allocation interleaving.

As shown in FIG. 12, in some aspects, process 1200 may include transmitting, to a UE, an indication of at least one of a first interleaving mode for mapping codeblocks to a data channel or a second interleaving mode for reporting CSI (block 1210). For example, the base station (e.g., using transmit processor 220, controller/processor 240, memory 242, and/or the like) may transmit, to a UE, an indication of a first interleaving mode for mapping codeblocks to a data channel and/or a second interleaving mode for reporting CSI, as described above.

As further shown in FIG. 12, in some aspects, process 1200 may include mapping codeblocks to the data channel based at least in part on the first interleaving mode (block 1220). For example, the base station (e.g., using transmit processor 220, receive processor 238, controller/processor 240, memory 242, and/or the like) may map codeblocks to the data channel based at least in part on the first interleaving mode, as described above.

As further shown in FIG. 12, in some aspects, process 1200 may include receiving a CSI report, wherein CSI included in the CSI report is estimated based at least in part on the second interleaving mode (block 1230). For example, the base station (e.g., using receive processor 238, controller/processor 240, memory 242, and/or the like) may receive a CSI report, as described above. In some aspects, CSI included in the CSI report is estimated based at least in part on the second interleaving mode.

Process 1200 may include additional aspects, such as any single aspect or any combination of aspects described in connection with one or more other processes described elsewhere herein, such as process 1000, process 1100, and/or process 1300.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
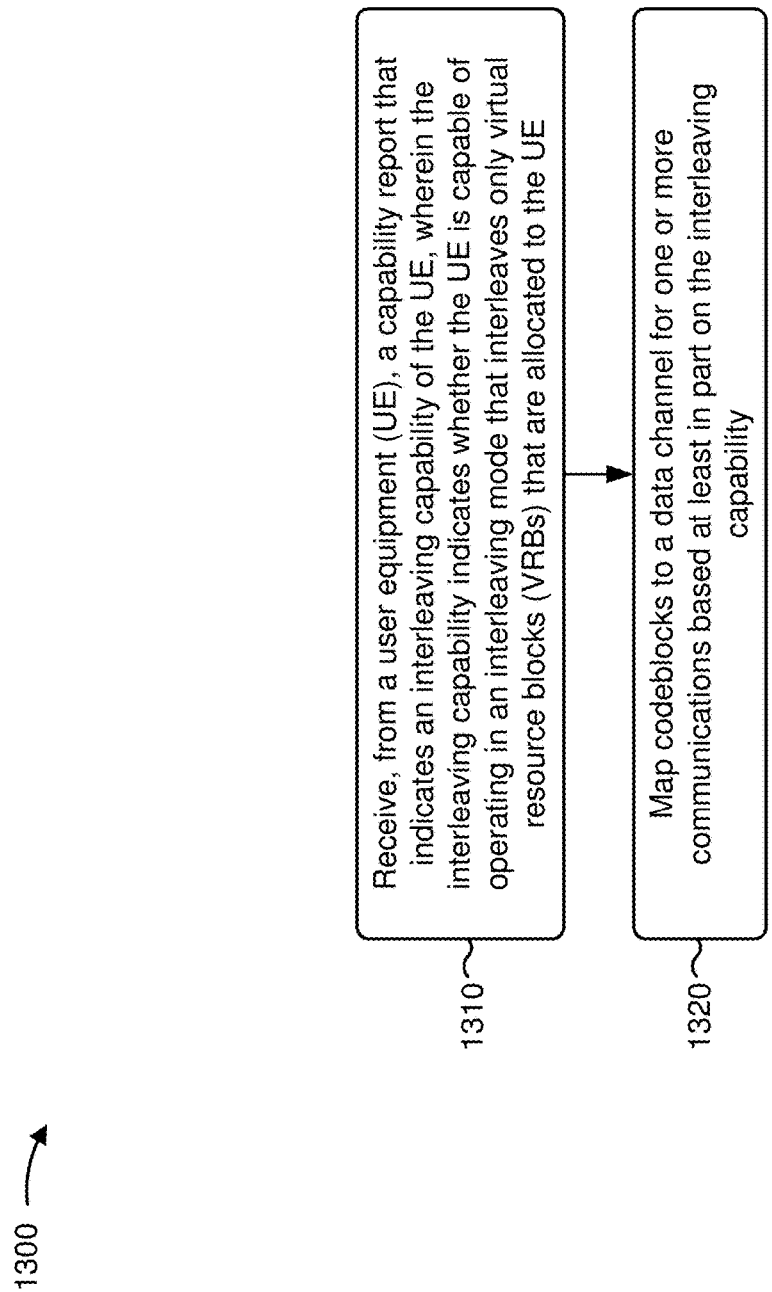

FIG. 13 is a diagram illustrating an example process 1300 performed, for example, by a base station, in accordance with various aspects of the present disclosure. Example process 1300 is an example where a base station (e.g., base station 110 and/or the like) performs operations associated with configuring and signaling an interleaving mode that includes in-allocation interleaving.

As shown in FIG. 13, in some aspects, process 1300 may include receiving, from a UE, a capability report that indicates an interleaving capability of the UE, wherein the interleaving capability indicates whether the UE is capable of operating in an interleaving mode that interleaves only VRBs that are allocated to the UE (block 1310). For example, the base station (e.g., using receive processor 238, controller/processor 240, memory 242, and/or the like) may receive, from a UE, a capability report that indicates an interleaving capability of the UE, as described above. In some aspects, the interleaving capability indicates whether the UE is capable of operating in an interleaving mode that interleaves only VRBs that are allocated to the UE.

As further shown in FIG. 13, in some aspects, process 1300 may include mapping codeblocks to a data channel for one or more communications based at least in part on the interleaving capability (block 1320). For example, the base station (e.g., using transmit processor 220, receive processor 238, controller/processor 240, memory 242, and/or the like) may map codeblocks to a data channel for one or more communications based at least in part on the interleaving capability, as described above.

Process 1300 may include additional aspects, such as any single aspect or any combination of aspects described in connection with one or more other processes described elsewhere herein, such as process 1000, process 1100, and/or process 1200.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:

receiving an indication of at least one of a first interleaving mode for mapping codeblocks to a data channel that is one of a downlink data channel or an uplink data channel or a second interleaving mode for reporting channel state information (CSI), wherein the first interleaving mode and the second interleaving mode include at least one of a non-interleaved mode, an interleaving mode that interleaves virtual resource blocks (VRBs) regardless of whether those VRBs are allocated to the UE, or an interleaving mode that interleaves only VRBs that are allocated to the UE; and performing at least one of:
mapping codeblocks to the data channel based at least in part on the first interleaving mode, wherein, if the data channel is the downlink data channel, mapping the codeblocks to the data channel comprises de-interleaving codeblocks received via the downlink data channel based at least in part on the first interleaving mode, and wherein, if the data channel is the uplink data channel, mapping the codeblocks to the data channel comprises interleaving codeblocks for transmission via the uplink data channel based at least in part on the first interleaving mode,
reporting CSI based at least in part on the second interleaving mode.

2. The method of claim 1, wherein the first interleaving mode and the second interleaving mode are the same.

3. The method of claim 1, wherein the first interleaving mode and the second interleaving mode are different.

4. The method of claim 1, wherein the indication is included in at least one of a radio resource control message, downlink control information, or a combination thereof.

5. The method of claim 1, wherein the first interleaving mode and the second interleaving mode are indicated using a single parameter in a radio resource control message.

6. The method of claim 1, wherein the first interleaving mode is indicated using a first parameter in a radio resource control message and the second interleaving mode is indicated using a second parameter in the radio resource control message.

7. The method of claim 1, wherein the second interleaving mode is explicitly indicated in a radio resource control message, and the first interleaving mode is implicitly indicated in the radio resource control message based at least in part on a set of interleaving modes configured in the radio resource control message for a corresponding set of CSI reports.

8. The method of claim 7, wherein the UE is configured to determine that the first interleaving mode is an in-allocation interleaving mode if all CSI reports, in the set of CSI reports indicated in the radio resource control message, are configured with the in-allocation interleaving mode.

9. The method of claim 7, wherein the UE is configured to determine that the first interleaving mode is an in-allocation interleaving mode if any CSI report, in the set of CSI reports indicated in the radio resource control message, is configured with the in-allocation interleaving mode.

10. The method of claim 1, wherein a radio resource control message indicates, for the first interleaving mode, an interleaving mode to be used when interleaving is enabled, and wherein downlink control information indicates whether interleaving is enabled or disabled for mapping codeblocks to the data channel.

11. The method of claim 1, wherein the first interleaving mode is a non-interleaved mode if a bit in downlink control information is set to a first value, and wherein the first interleaving mode uses a first type of interleaving for a first set of communications and a second type of interleaving for a second set of communications if the bit in the downlink control information is set to a second value.

12. The method of claim 11, wherein the first type of interleaving interleaves all VRBs regardless of whether those VRBs are allocated to the UE, and wherein the second type of interleaving interleaves only VRBs that are allocated to the UE.

13. The method of claim 11, wherein the first interleaving mode is indicated in a radio resource control message if the bit in the downlink control information is set to the second value.

14. The method of claim 11, wherein the first set of communications includes at least one of system information or communications scheduled using downlink control information in a common search space, and wherein the second set of communications includes at least one of communications other than system information or communications other than communications scheduled using downlink control information in the common search space.

15. The method of claim 1, wherein the first interleaving mode is indicated in downlink control information for at least one of system information or communications scheduled using downlink control information in a common search space, and wherein the first interleaving mode is indicated in a radio resource control message for communications other than the at least one of system information or communications scheduled using downlink control information in the common search space.

16. The method of claim 15, wherein the first interleaving mode indicated in the downlink control information is either a non-interleaved mode or an interleaving mode that interleaves VRBs regardless of whether those VRBs are allocated to the UE.

17. The method of claim 15, wherein the first interleaving mode indicated in the radio resource control message is one of a plurality of interleaving modes, wherein the plurality of interleaving modes includes at least two of a non-interleaved mode, an interleaving mode that interleaves VRBs regardless of whether those VRBs are allocated to the UE, or an interleaving mode that interleaves only VRBs that are allocated to the UE.

18. The method of claim 1, wherein the first interleaving mode is indicated using only downlink control information for system information, and wherein the first interleaving mode is indicated using only a radio resource control message for communications other than system information.

19. The method of claim 1, wherein the first interleaving mode is a non-interleaved mode if a bit in downlink control information is set to a first value, and wherein the first interleaving mode uses a first type of interleaving or a second type of interleaving if the bit in the downlink control information is set to a second value.

20. The method of claim 19, wherein the first type of interleaving interleaves all VRBs regardless of whether those VRBs are allocated to the UE, and wherein the second type of interleaving interleaves only VRBs that are allocated to the UE.

21. The method of claim 19, wherein the first interleaving mode is indicated in a radio resource control message if the bit in the downlink control information is set to the second value.

22. The method of claim 1, further comprising:
transmitting, to a base station, a capability report that indicates an interleaving capability of the UE; and receiving the indication from the base station based at least in part on transmitting the capability report that indicates the interleaving capability of the UE,
wherein at least one of the first interleaving mode or the second interleaving mode is based at least in part on the interleaving capability of the UE.

23. A method of wireless communication performed by a user equipment (UE), comprising:
transmitting, to a base station, a capability report that indicates an interleaving capability of the UE, wherein the interleaving capability indicates whether the UE is capable of operating in an interleaving mode that interleaves only virtual resource blocks (VRBs) that are allocated to the UE; and
mapping codeblocks to a data channel that is one of a downlink data channel or an uplink data channel for one or more communications based at least in part on the interleaving capability, wherein, if the data channel is the downlink data channel, mapping the codeblocks to the data channel comprises de-interleaving codeblocks received via the downlink data channel based at least in part on the interleaving mode, and wherein, if the data channel is the uplink data channel, mapping the codeblocks to the data channel comprises interleaving codeblocks for transmission via the uplink data channel based at least in part on the interleaving mode.

24. A method of wireless communication performed by a base station, comprising:
transmitting, to a user equipment (UE), an indication of at least one of a first interleaving mode for mapping codeblocks to a data channel that is one of a downlink data channel or an uplink data channel or a second interleaving mode for reporting channel state information (CSI), wherein the first interleaving mode and the second interleaving mode include at least one of a non-interleaved mode, an interleaving mode that interleaves virtual resource blocks (VRBs) regardless of whether those VRBs are allocated to the UE, or an interleaving mode that interleaves only VRBs that are allocated to the UE; and
performing at least one of:
mapping codeblocks to the data channel based at least in part on the first interleaving mode, wherein, if the data channel is the downlink data channel, mapping the codeblocks to the data channel comprises interleaving codeblocks transmitted via the downlink data channel based at least in part on the first interleaving mode, and wherein, if the data channel is the uplink data channel, mapping the codeblocks to the data channel comprises de-interleaving codeblocks received via the uplink data channel based at least in part on the first interleaving mode, or
receiving a CSI report, wherein CSI included in the CSI report is estimated based at least in part on the second interleaving mode.

25. The method of claim 24, further comprising:
receiving, from the UE, a capability report that indicates an interleaving capability of the UE; and
transmitting the indication to the UE based at least in part on the capability report, wherein at least one of the first interleaving mode or the second interleaving mode is based at least in part on the interleaving capability of the UE.

26. A user equipment (UE) for wireless communication, comprising:
memory;
one or more processors coupled to the memory; and
instructions stored in the memory and operable, when executed by the one or more processors, to cause the UE to:
receive an indication of at least one of a first interleaving mode for mapping codeblocks to a data channel that is one of a downlink data channel or an uplink data channel or a second interleaving mode for reporting channel state information (CSI), wherein the first interleaving mode and the second interleaving mode include at least one of a non-interleaved mode, an interleaving mode that interleaves virtual resource blocks (VRBs) regardless of whether those VRBs are allocated to the UE, or an interleaving mode that interleaves only VRBs that are allocated to the UE; and
perform at least one of:
map codeblocks to the data channel based at least in part on the first interleaving mode, wherein, if the data channel is the downlink data channel, mapping the codeblocks to the data channel comprises de-interleaving codeblocks received via the downlink data channel based at least in part on the first interleaving mode, and wherein, if the data channel is the uplink data channel, mapping the codeblocks to the data channel comprises interleaving codeblocks for transmission via the uplink data channel based at least in part on the first interleaving mode, or
report CSI based at least in part on the second interleaving mode.

27. The UE of claim 26, wherein the instructions stored in the memory are further operable, when executed by the one or more processors, to cause the UE to:
transmit, to a base station, a capability report that indicates an interleaving capability of the UE; and
receive the indication from the base station based at least in part on transmitting the capability report that indicates the interleaving capability of the UE,
wherein at least one of the first interleaving mode or the second interleaving mode is based at least in part on the interleaving capability of the UE.

28. The UE of claim 26, wherein the first interleaving mode and the second interleaving mode are indicated using a single parameter in a radio resource control message.

29. The UE of claim 26, wherein the first interleaving mode is indicated using a first parameter in a radio resource control message and the second interleaving mode is indicated using a second parameter in the radio resource control message.

30. The UE of claim 26, wherein the second interleaving mode is explicitly indicated in a radio resource control message, and the first interleaving mode is implicitly indicated in the radio resource control message based at least in part on a set of interleaving modes configured in the radio resource control message for a corresponding set of CSI reports.

* * * * *